(12) United States Patent
Lovegrove

(10) Patent No.: US 12,014,514 B2
(45) Date of Patent: *Jun. 18, 2024

(54) TARGET CLASSIFICATION SYSTEM

(71) Applicant: Morphix, Inc., Vancouver, WA (US)

(72) Inventor: Jonathan Lovegrove, Yacolt, WA (US)

(73) Assignee: MORPHIX, INC., Vancouver, WA (US)

( * ) Notice: Subject to any disclaimer, the term of this patent is extended or adjusted under 35 U.S.C. 154(b) by 30 days.

This patent is subject to a terminal disclaimer.

(21) Appl. No.: 17/647,309

(22) Filed: Jan. 6, 2022

(65) Prior Publication Data

US 2022/0392098 A1 Dec. 8, 2022

Related U.S. Application Data

(63) Continuation-in-part of application No. 17/338,885, filed on Jun. 4, 2021.

(51) Int. Cl.
*G06T 7/70* (2017.01)
*G06F 3/0484* (2022.01)
(Continued)

(52) U.S. Cl.
CPC .............. *G06T 7/70* (2017.01); *G06F 3/0484* (2013.01); *G06V 10/764* (2022.01); *G06V 20/17* (2022.01);
(Continued)

(58) Field of Classification Search
CPC .............. G06T 7/70; G06T 2207/30244; G06F 3/0484; G06V 10/764; G06V 20/17;
(Continued)

(56) References Cited

U.S. PATENT DOCUMENTS 4,878,305 A * 11/1989 Gabrielidis ............. F41A 19/09
42/118
7,263,206 B1 * 8/2007 Milbert ................... F41A 17/08
348/169
(Continued)

FOREIGN PATENT DOCUMENTS

GB 2290483 A 1/1996
WO WO-2021162641 A1 * 8/2021 ............. F41H 7/005

OTHER PUBLICATIONS

"Xin Zhao et al., Line of Sight Pointing Technology for Laster Communication System Between Aircrafts, Opt. Eng. 56(12), 126107 [Dec. 2017]" (Year: 2017).*

(Continued)

*Primary Examiner* — Andrae S Allison
*Assistant Examiner* — Phuong Hau Cai
(74) *Attorney, Agent, or Firm* — Alleman Hall & Tuttle LLP

(57) ABSTRACT

One example provides a target classification system comprising a display subsystem configured to display an image captured by a camera of an in-field device. The image includes one or more targets. The target classification system is configured to receive a user input indicating a location of the one or more targets in a screen space coordinate system of the display subsystem. Location information in a world space coordinate system is determined by receiving a pose of the camera; using the pose of the camera and the location in the screen space to trace a ray; and using at least a position of the camera and an orientation of the ray to generate coordinates in the world space. Target classification information is determined, and targeting data is output comprising the coordinates in the world space and the target classification information.

20 Claims, 23 Drawing Sheets

(51) Int. Cl.
*G06V 10/764* (2022.01)
*G06V 20/17* (2022.01)

(52) U.S. Cl.
CPC .............. *G06T 2207/30244* (2013.01); *G06V 2201/07* (2022.01)

(58) Field of Classification Search
CPC ....... G06V 2201/07; F41G 3/04; F41G 3/165; F41G 3/326; F41G 3/02
See application file for complete search history.

(56) References Cited

U.S. PATENT DOCUMENTS

2008/0204361 A1   8/2008   Scales et al.
2020/0355454 A1   11/2020  Deng et al.

OTHER PUBLICATIONS

"Zhang Weiwei et al., The Integrated Panoramic Surveillance System Based on Tethered Balloon, Beijing Institute of Space Mechanics & Electricity, Jun. 8, 2015, 1095-323X" hereinafter as "Weiwei"). (Year: 2015).*

"D. M. Arnold et al., RINGO3: a multi-colour fast response polarimeter, Proceedings vol. 8446, Ground-based and Airborne Instrumentation for Astronomy IV, 2012" (Year: 2012).*

"Yan Wang et al., Pseudo-LiDAR from Visual Depth Estimation: Bridging the Gap in 3D Object Detection for Autonomous Driving, Proceedings of the IEEE/CVF Conference on Computer Vision and Pattern Recognition (CVPR), 2019, pp. 8445-8453" (Year: 2019).*

"Y. Oshman et al., Optimization of Observer Trajectories for Bearings-Only Target Localization, IEEE Transactions on Aerospace and Electronic Systems vol. 35, Issue: 3, Jul. 1999" (Year: 1999).*

"Ankita Vijay Tondwalkar et al., Terrestrial Localization by Using Angle of Arrival Measurements in Wireless Sensor Network, IEEE 2015 International Conference on Computational Intelligence and Communication Networks, Dec. 2015" (Year: 2015).*

"Morten Breivil et al., Guidance Laws for Planar Motion Control, Proceedings of the 47th IEEE Conference on Decision and Control Cancun, Mexico, Dec. 9-11, 2008" (Year: 2008).*

"Janos Sallai et al., Weapon Classification and Shooter Localization using Distributed Multichannel Acoustic Sensors, May 2011, Journal of Systems Architecture 57 869-885" (Year: 2011).*

"N/A, Electromagnetic Propagation Problems in the Tactical Environment, Apr. 1982, Presented at Electromagnetic Wave Propagation Panel and the Consultant and Exchange Programme of AGARD on May 3-4, 1982 in Munich, Germany and on May 6-7, 1982 in Paris, France. ISBN 92-835-1419-X" (Year: 1982).*

ISA United States Patent and Trademark Office, International Search Report and Written Opinion Issued in Application No. PCT/US2023/060186, Sep. 1, 2023, WIPO, 16 pages.

Foxlin, E. et al., "FlightTracker: A Novel Optical/Inertial Tracker for Cockpit Enhanced Vision," Proceedings of the Third IEEE and ACM International Symposium on Mixed and Augmented Reality (ISMAR 2004), Nov. 2, 2004, Arlington, VA, 30 pages.

ISA United States Patent and Trademark Office, International Search Report and Written Opinion Issued in Application No. PCT/US2022/030858, Jan. 11, 2024, WIPO, 18 pages.

* cited by examiner

TARGET CLASSIFICATION SYSTEM

CROSS-REFERENCE TO RELATED APPLICATIONS

This application is a continuation-in-part of U.S. patent application Ser. No. 17/338,885 titled TARGET CLASSIFICATION SYSTEM filed Jun. 4, 2021, which is incorporated herein by reference in its entirety.

BACKGROUND

Accurate knowledge of a location and a classification (e.g., friend or foe) of one or more targets, such as a person, a building, or any other point of interest, can be an important aspect of military or emergency response operations. To obtain such data, an individual can survey an environment, locate, and classify the one or more targets. However, it can be challenging to do so quickly and accurately. It can also be difficult to combine data obtained from multiple different individuals or systems.

SUMMARY

According to one aspect of the present disclosure, a target classification system is provided. The target classification system comprises a display subsystem configured to display an image captured by a camera of an in-field device. The image includes one or more targets. A user input device is configured to receive user input corresponding to locations in the image displayed on the display subsystem. The target classification system further comprises a processor and a memory storing instructions executable by the processor. The instructions are executable to receive a user input from the user input device indicating a location of the one or more targets in a screen space coordinate system of the display subsystem. Location information for the one or more targets in a world space coordinate system of the in-field device is determined by receiving, from a pose sensor of the in-field device, a pose of the camera; using the pose of the camera and the location of the one or more targets in the screen space to trace a ray between the camera and the one or more targets in the world space; and using at least a position of the camera and an orientation of the ray to generate coordinates of the one or more targets in the world space. Target classification information for the one or more targets is determined by tagging the one or more targets with a first target classification when the user input indicates a first input type, and tagging the one or more targets with a second target classification when the user input indicates a second input type. The instructions are further executable to output targeting data comprising the coordinates of the one or more targets in the world space and the target classification information.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

As introduced above, accurate knowledge of a location and a classification (e.g., friend or foe) of one or more targets, such as a person, a building, or any other point of interest, can be an important aspect of military or emergency response operations. To obtain such data, an individual can survey an environment, classify, and locate the one or more targets.

Figure 1:
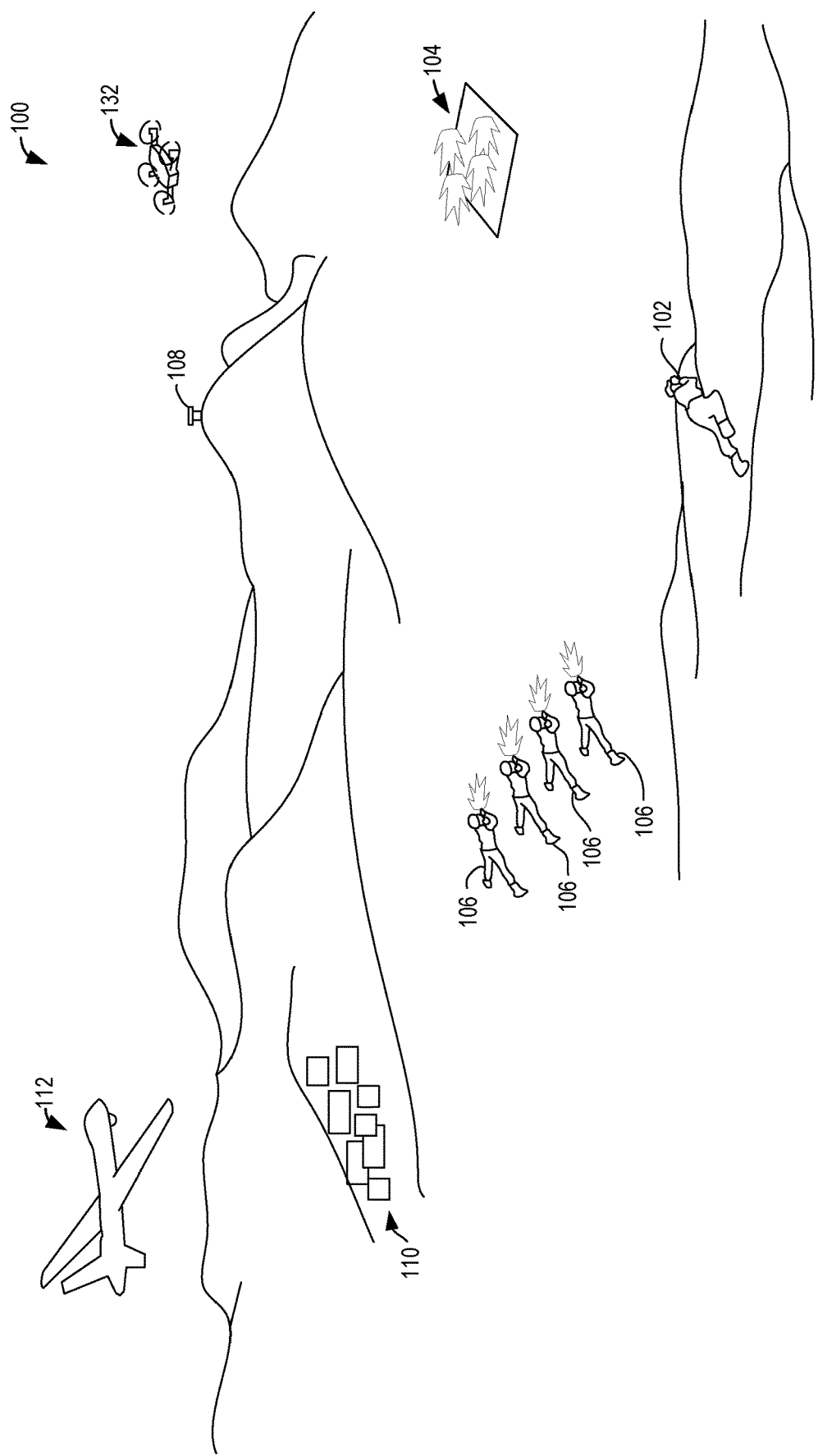
FIG. 1 shows one example of an environment including a plurality of targets according to one example embodiment.

FIG. 1 shows one example of an environment 100, in which an observer 102 is surveying a plurality of targets. The targets include an enemy firing position 104, a team of friendly soldiers 106, an enemy sniper position 108, and a village 110. The environment 100 is also observed by a friendly drone 112 and an enemy drone 132.

In some examples, it can be challenging for the observer 102 to determine a location and a classification of a target quickly and accurately. For example, performing intersection using a map and a compass can be a time and labor-intensive process. It can also take additional time and labor to integrate information on the location and the classification of the target collected by the observer 102 and other individuals (e.g., the soldiers 106) or systems (e.g., the drone 112), and to communicate that information to others (e.g., by radioing the location and the classification of the target to a remote command post). Manual communication can be further hindered in stressful situations, such as when the soldiers 106 are taking fire from the enemy position 104.

Electronic systems can be used to map the environment 100, determine a location of each target, and classify each target. However, some such systems emit lasers, radar, or infrared light to map the environment 100. These emissions can betray a location of a user (e.g., the observer 102). Other systems that are based on visual mapping technologies may have short operational ranges (e.g., up to 50-60 feet), which may not be suitable for use in larger environments, where targets may be hundreds or thousands of feet away. In other examples, radionavigation systems (e.g., GPS) can be jammed.

Figure 2:
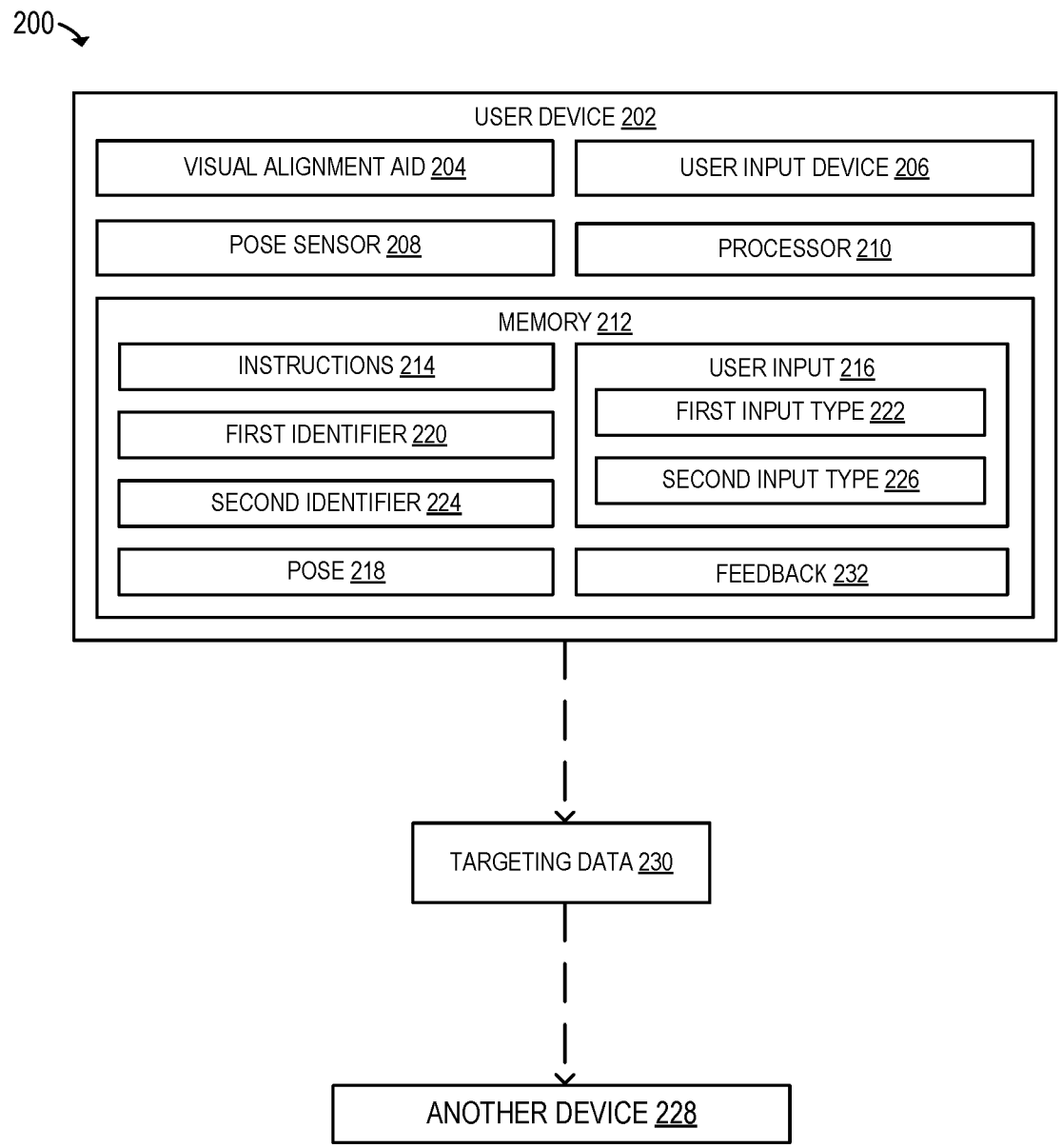
FIG. 2 shows a schematic diagram of an example system for classifying a target according to one example embodiment.

To address the above shortcomings, and with reference now to FIG. 2, a system 200 is provided including a user device 202. As described in more detail below with reference to FIGS. 4 and 5, the user device 202 includes a visual alignment aid 204 that is configured to indicate a line of sight to one or more of a plurality of targets within a field of view. The user device 202 further comprises a user input device 206 configured to receive a plurality of user input types including a first input type 222 and a second input type 226. The user device 202 also comprises a pose sensor 208, which is fixed to the user device 202 and configured to determine a pose of the line of sight.

The user device 202 further comprises a processor 210 and a memory 212 storing instructions 214 executable by the processor 210. Briefly, the instructions 214 are executable by the processor 210 to: receive a user input 216 from the user input device 206; determine, using the pose sensor 208, the pose 218 of the line of sight; tag the one or more targets with a first target classification 220 when a first input type 222 is received; tag the one or more targets with a second target classification 224 when the second input type 226 is received; and output, to another device 228, targeting data 230 comprising the pose 218 of the line of sight and at least one of the first target classification 220 or the second target classification 224.

Figure 3:
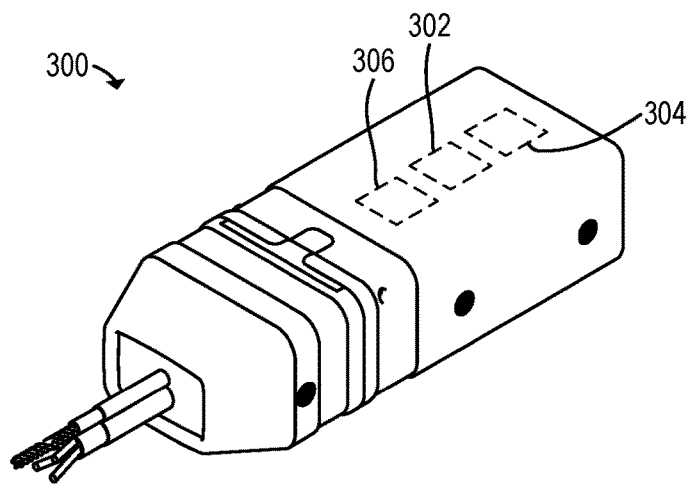
FIG. 3 shows one example of a computing device according to one example embodiment.

FIG. 3 shows one example of a computing device 300. The computing device 300 comprises a processor 302 and a memory 304, which may be configured to enact at least a portion of the methods disclosed herein. In some examples, the computing device 300 may be referred to as an edge computing device. An edge computing device is a computing device having a position on a network topology between a local network and a wider area network (e.g., the Internet). Additional aspects of the computing device 300 are described in more detail below with reference to FIG. 13.

The computing device 300 further comprises a pose sensor 306 configured to determine a position and an orientation of the computing device 300. In some examples, the pose sensor 306 comprises one or more of an inertial measurement unit (IMU), an accelerometer, a gyroscope, a compass, a global positioning system (GPS) sensor, or an altimeter. For example, the pose sensor 306 may comprise an IMU having an accuracy within 1 minute of angle (MOA). It will also be appreciated that the pose sensor may comprise any other suitable sensor.

Figure 4:
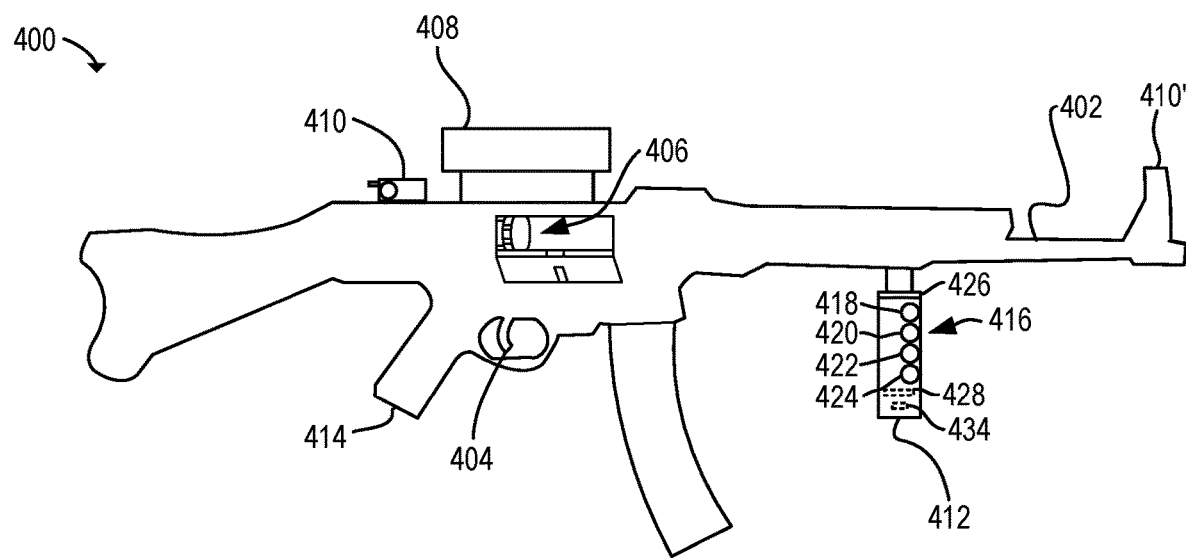
FIG. 4 shows one example of a user device according to one example embodiment.

In some examples, and with reference now to FIG. 4, the user device takes the form of a weapon 400. The weapon 400 comprises a barrel 402, a trigger 404, and a firing mechanism 406. The weapon 400 further comprises visual alignment aids in the form of an optical scope 408 and iron sights 410 and 410'. The visual alignment aids are configured to help a user aim the weapon 400 at one or more targets by indicating that the user's line of sight is aligned with the one or more targets. As described in more detail below with reference to FIG. 9, the visual alignment aids may be offset from a path of the barrel 402. In some examples, this offset may be considered when computing where the weapon 400 is pointed.

Figure 5:
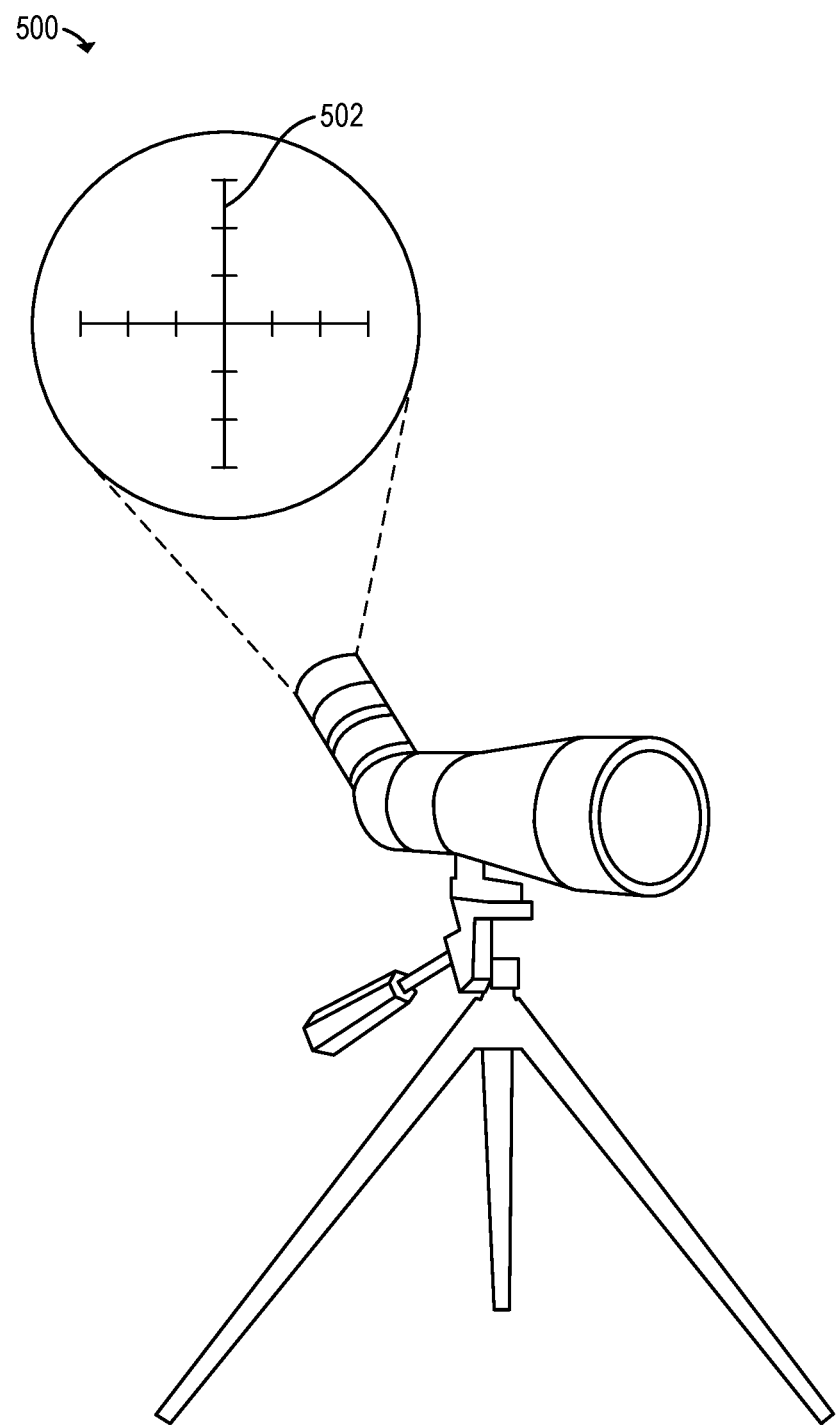
FIG. 5 shows another example of a user device according to one example embodiment.

FIG. 5 shows another example of a user device in the form of a spotting scope 500. The spotting scope 500 comprises a visual alignment aid in the form of a reticle 502. It will also be appreciated that the user device may take the form of any other suitable optical instrument, such as binoculars or a theodolite.

With reference again to FIG. 4, the weapon 400 further comprises a foregrip 412 and a trigger grip 414. In some examples, a computing device is integrated into the weapon (e.g., inside of the foregrip 412 or the trigger grip 414). In other examples, a computing device can be affixed to the weapon 400 as an accessory. For example, the computing device can be mounted to the weapon 400 via a Picatinny rail system (e.g., according to United States Military Standard MIL-STD-1913).

In the example of FIG. 4, a user input device is provided on the foregrip 412. The user input device comprises a keypad 416, which comprises a plurality of buttons 418, 420, 422, and 424. In other examples, the user input device can take the form of a single button. It will also be appreciated that any other suitable type of user input device may be used. Some other suitable types of user input devices include a microphone and a touch screen. For example, a microphone 434 may be integrated with the foregrip 412 and configured to receive a verbal input from a user as described in more detail below with reference to FIG. 7. Another example of using a touch screen to receive a user input via a graphic user interface (GUI) is described in more detail below with reference to FIG. 15.

The buttons 418, 420, 422, and 424 are arranged vertically along a right side of the foregrip 412. In some examples, the buttons can be provided on a different side of the foregrip 412. In other examples, the buttons can be provided on both the right side and a left side of the foregrip 412 to allow the computing device to receive ambidextrous user inputs. In yet other examples, the buttons may be provided on the trigger grip 414, or at any other suitable location. In this manner, the buttons may be easily accessible to a user.

In some examples, each of the buttons 418, 420, 422, and 424 corresponds to a different type of user input. For example, and as described in more detail below with reference to FIGS. 6 and 7, each button may be used to tag a target with a different target classification.

In some examples, the foregrip 412 further includes a light 426 and a haptic feedback device 428 (e.g., a linear resonant actuator) configured to provide feedback in response to receiving a user input. It will also be appreciated that any other suitable type of feedback may be provided. For example, an indication may be displayed on an optionally connected display device (e.g., a head-mounted display device, not shown), or displayed within the scope 408.

Figure 6:
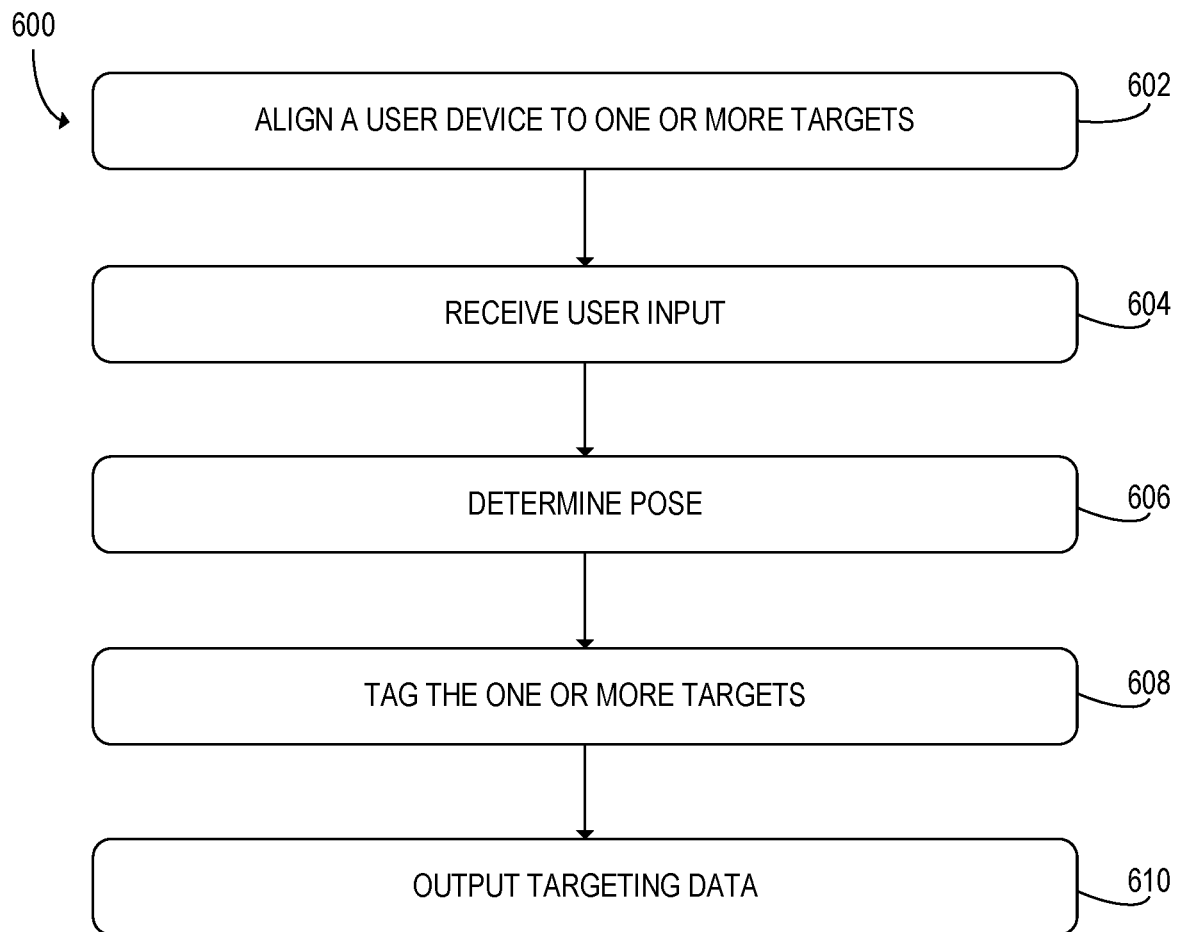
FIG. 6 shows a flowchart of an example method for classifying a target according to one example embodiment.

With reference now to FIG. 6, a flowchart is illustrated depicting an example method 600 for classifying a target. The following description of method 600 is provided with reference to the software and hardware components described above and shown in FIGS. 1-5 and 7-15. In some examples, the method 600 may be performed at the user device 202 of FIG. 2, the computing device 300 of FIG. 3, the weapon 400 of FIG. 4, or the spotting scope 500 of FIG. 5. It will be appreciated that method 600 also may be performed in other contexts using other suitable hardware and software components.

It will be appreciated that the following description of method 600 is provided by way of example and is not meant to be limiting. It will be understood that various steps of method 600 can be omitted or performed in a different order than described, and that the method 600 can include additional and/or alternative steps relative to those illustrated in FIG. 6 without departing from the scope of this disclosure.

At 602, the method 600 includes using a visual alignment aid to align a user device along a line of sight to one or more of a plurality of targets within a user's field of view. For example, and with reference again to the example environment 100 of FIG. 1, the observer 102 may possess a user device, such as the weapon 400. Using the visual alignment aid, the observer 102 may aim the user device at a target, such as the enemy firing position 104, that is within the observer's field of view. It will also be appreciated that the one or more targets may comprise any other suitable types of targets (including point targets and area targets), including humans and non-human objects. For example, each of the soldiers 106 may comprise a human target. The friendly drone 112 and the enemy drone 132 may comprise non-human targets. Other examples of targets can include buildings, equipment, plants, animals, bodies of water, roads, railway lines, and terrain features.

Figure 7:
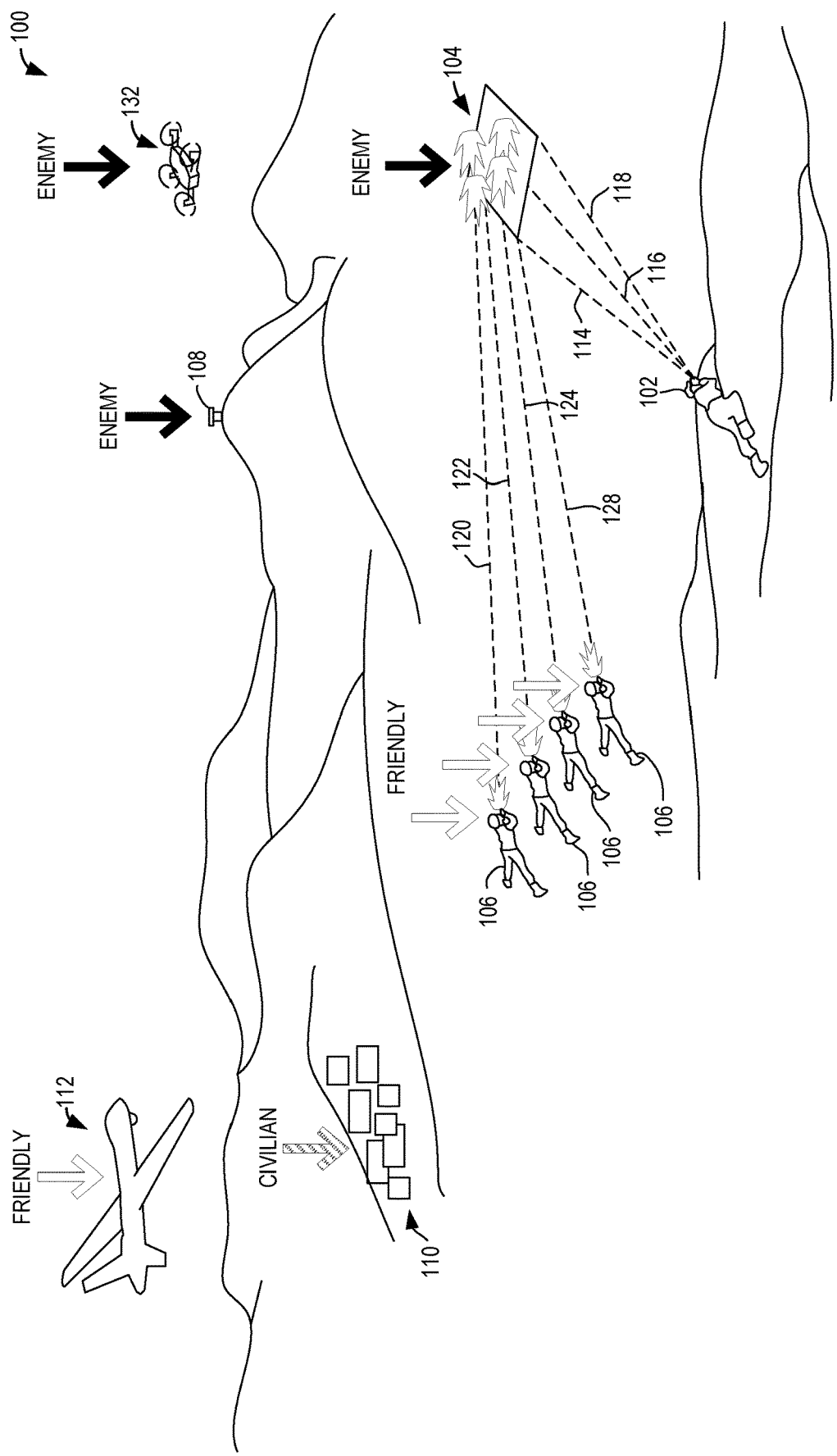
FIG. 7 shows the environment of FIG. 1 overlaid with example targeting data according to one example embodiment.

Next, at 604, the method 600 includes receiving a user input. Upon receiving the user input, at 606, the method 600 includes determining a pose of the line of sight. The pose includes the location of the user device and the orientation of the line of sight. The pose can be determined by the pose sensor 208 of FIG. 2 or the pose sensor 306 of FIG. 3. In the example of FIG. 7, the pose includes the location of the observer 102 and the orientation of the line of sight 114 from the observer 102 to the enemy firing position 104.

In some examples, the pose of the line of sight may be determined using a factory calibration of the pose sensor. In other examples, and as described in more detail below with reference to FIGS. 10 and 11, the pose sensor may be calibrated using a field calibration procedure based upon a known pose of the line of sight.

At 608, the method 600 includes tagging the one or more targets based upon the user input received. The one or more targets may be tagged with at least one target classification based upon a type of user input received. For example, and with reference again to FIG. 4, the first button 418 may be pressed when the weapon 400 is aimed at one or more targets to classify the one or more targets as "ENEMY". The second button 420 may be pressed to classify the one or more targets as "FRIENDLY". The third button 422 may be pressed to classify the one or more targets as "ALLIED", and the fourth button 424 may be pressed to classify the one or more targets as "CIVILIAN". It will also be appreciated that any other suitable tag(s) may be used.

In other examples, a single button may be used to provide multiple different types of user inputs. For example, one or more targets may be classified as "CIVILIAN" by depressing the button for at least a first threshold time (e.g., 2 seconds), and releasing the button after the first threshold time. The one or more targets may be classified as "ENEMY" by depressing the button for at least a second threshold time (e.g., 4 seconds), and releasing the button after the second threshold time.

In this manner, and with reference again to FIG. 7, the observer 102 may tag the enemy firing position 104 and the sniper position 108 with an "ENEMY" target classification. Each of the soldiers 106 may be tagged with a "FRIENDLY" target classification, and the village 110 may be tagged with a "CIVILIAN" target classification. The friendly drone 112 may be tagged with a "FRIENDLY" target classification, and the enemy drone 132 may be tagged with an "ENEMY" target classification.

As another example, the microphone 424 of FIG. 4 may be used to classify the one or more targets by receiving a verbal input provide by a user. For example, the user may say "enemy" while the weapon 400 is aimed at one or more targets. The user's utterance of "enemy" may be processed by a natural language processing (NLP) model to classify the one or more targets as "ENEMY". The microphone 424 may be additionally or alternatively used to receive directional information. For example, one or more of the soldiers 106 of FIGS. 1 and 7 may shout "contact, 12 o'clock!" in response to taking fire from the enemy firing position 104. In this manner, the user input indicates that the one or more of the soldiers 106 are taking fire, and a relative (clock) bearing to the origin of the fire, which may be used to determine the location of the enemy firing position 104. As another example, the user 102 may say "enemy, 45 degrees", which may indicate both a target classification and an azimuth to the enemy firing position 104.

In some examples, the one or more targets may be tagged more than once, by the same individual or by different individuals. For example, as shown in FIG. 7, the observer 102 may tag a second line of sight 116 and a third line of sight 118 to the enemy firing position 104. The enemy firing position 104 may also be tagged by each of the soldiers 106 having lines of sight 120-128. In this manner, the enemy firing position 104 may be located and classified with higher accuracy than if the enemy firing position 104 was tagged once. In some examples, and as described in more detail below, a user may be prompted to tag one or more specific targets (e.g., if a location and/or a classification of a target is not known with a desirable level of accuracy).

With reference again to FIG. 6, the method 600 includes, at 610, outputting targeting data comprising the pose of the line of sight and at least one target classification. In some examples, the targeting data is output to a local memory or processor on a user device. In other examples, the targeting data is output to another device (e.g., the device 228 of FIG. 2). For example, the targeting data may be output to a server computing device (e.g., at a data center or at a network edge location) configured to process the targeting data and determine the location of the one or more targets and the classification of the one or more targets.

Figure 8:
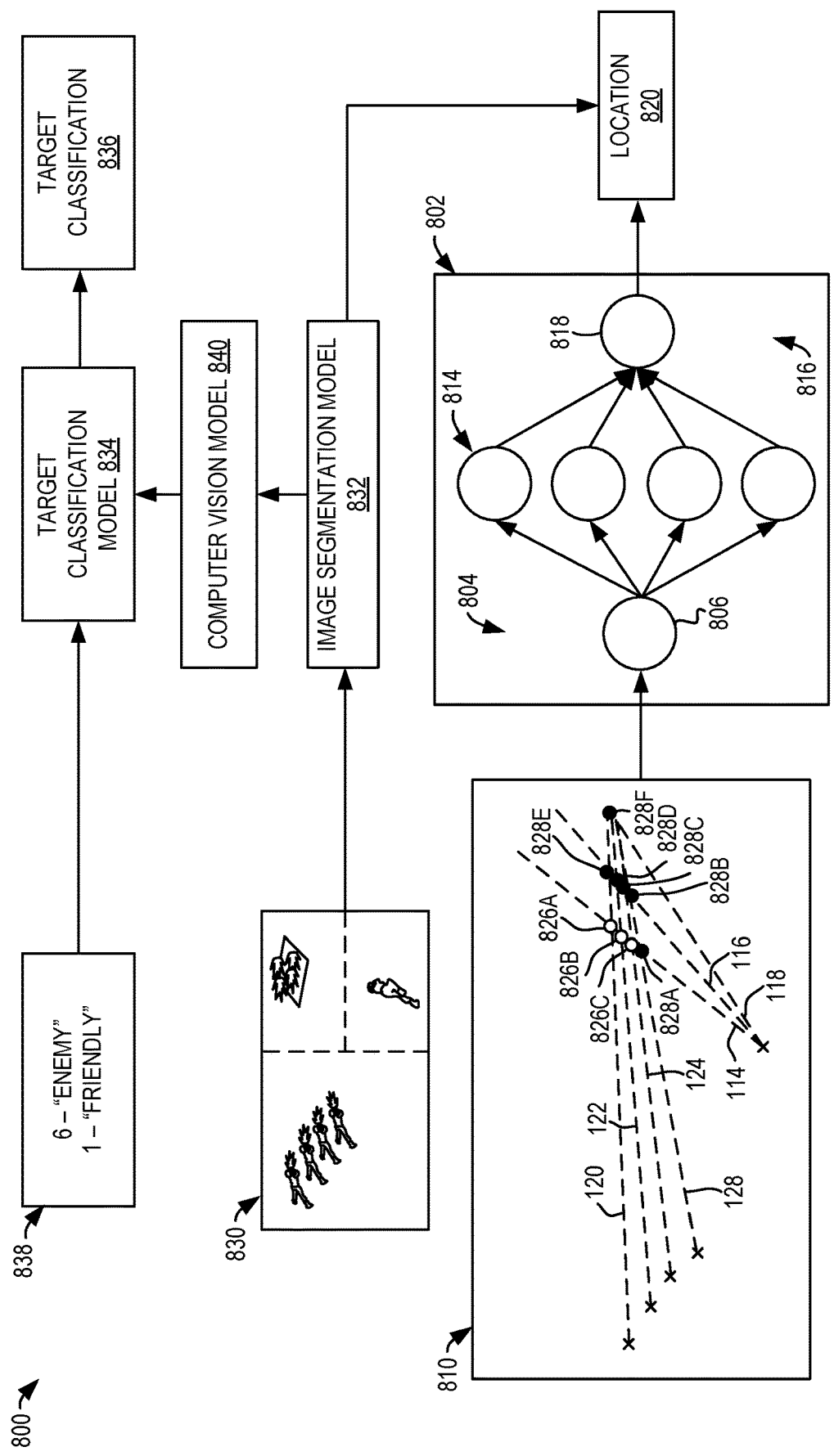
FIG. 8 shows a schematic diagram of one example of an artificial intelligence system for determining a location of one or more targets and a target classification of the one or more targets according to one example embodiment.

FIG. 8 schematically illustrates one example of an artificial intelligence (AI) system 800 that can be used for determining the location of the one or more targets and the classification of the one or more targets. In some examples, the AI system 800 may be implemented at the device 228 of FIG. 2. In other examples, the AI system 800 may be implemented at the user device 202 of FIG. 2, the computing device 300 of FIG. 3, the weapon 400 of FIG. 4, the spotting scope 500 of FIG. 5, or any suitable device or combination of devices disclosed herein.

For example, the AI system 800 can be implemented at one or more user devices and/or one or more network edge devices in a field environment. In this manner, the AI system 800 can provide faster response times and reduced latency relative to offloading the analysis of targeting data onto a remote server device. Further, the AI system 800 can continue to provide insights to users in the field (e.g., the soldiers 106 of FIG. 1) when communication with other devices (e.g., GPS satellites or remote servers) is jammed or otherwise unavailable.

In some examples, the AI system 800 includes a target location model 802 configured to determine a location of one or more targets. In the example of FIG. 8, the target location model 802 comprises a neural network having an input layer 804, one or more hidden layers 814, and an output layer 816. It will also be appreciated that the target location model 802 may comprise any other suitable type of model having any suitable architecture.

The input layer 804 comprises at least one neuron 806 configured to receive a feature vector (i.e., ordered set) of inputs. In the example of FIG. 8, the neuron 806 is configured to receive a user-input-based feature vector 810 that is based on the targeting data collected by the observer 102 and the soldiers 106 of FIG. 7.

In some examples, the input feature vector 810 comprises a pixel-based model resulting from a plurality of user inputs. For example, the input feature vector 810 may include a plurality of intersection points 826A-C and 828A-F. Each intersection point is located where two or more of the lines of sight 114-116 and 120-124 of FIG. 7 intersect. As described in more detail below, the intersection points 826A-C are phantom intersection points that do not correspond to a location of a target. In contrast, the intersection points 828A-F overlap with a location of the enemy firing position 104 shown in FIGS. 1 and 7.

The user-input-based input vector 810 may comprise a flattened representation of the intersection points. For example, the input vector 810 may comprise a two-dimensional map (e.g., in a north/south coordinate system) of the intersection points 826A-C and 828A-F. This may allow the model 802 to use a simpler architecture and/or decision boundary topography for analyzing the input vector 810. However, the input vector 810 may include more intersection points that occur when separation in additional dimensions (e.g., altitude and/or time) is not considered.

In other examples, the input vector 810 comprises a three-dimensional representation of the user inputs and/or a time series of the user inputs. Including more dimensions in the input vector 810 can simplify analysis by reducing the number of intersection points as described above. In some examples, the input vector 810 includes inputs from a rangefinder (e.g., a laser or sonar-based rangefinder). For example, to implement a sonar-based rangefinder, a plurality of microphones can be configured to detect an acoustic signal emitted by (in the case of passive sonar) or reflected by (in case of active sonar) a target, and the input vector 810 may include a position of each microphone and audio data collected via each microphone. In this manner, the target location model 802 can determine a location of the target (e.g., using the positions of the microphones and the Doppler shift between signals from each microphone).

Each of the lines of sight 114-116 and 120-124 of FIG. 7 can be modeled as a static or dynamic function. For example, a line of sight can be modeled as a straight line originating at a location of a user. The location of the user can be determined via GPS, accelerometer data, or any other suitable location-finding methods. The line of sight further comprises an altitude and/or an azimuth from the origin, which is determined from an output of the pose sensor as described above. In some examples, the line of sight may be augmented with ranging data (e.g., data from a laser or radar rangefinder including a distance from the user to the one or more targets). Using the ranging data, the AI system 800 can establish a location of the one or more targets more rapidly than by triangulating a plurality of lines of sight without advance knowledge of the distance to the one or more targets.

In some examples, each line of sight can be modeled as a decaying function. For example, and as described in more detail below, the line of sight may be weighted with a value that decays with increasing distance from the origin of the line of sight. The intersection points 826A-C and 828A-F may additionally or alternatively be weighted with a value that decays with increasing time since the intersection was formed. In some examples, the input vector 810 may be formed by selecting a subset of the intersection points 826A-C and 828A-F that have formed within a threshold duration (e.g., within the last 30 minutes), and discarding any older intersection points.

Values within the input vector may be normalized or scaled based on their respective input types. As one example, for an azimuth comprising values in a range of 0-360°, the input vector 810 may normalize a reported value of 180° to a value of 0.5 for a normalized range (0-1) for that input type. In this manner, each input may be normalized or scaled to a normalized range of (0-1) before being fed to the target location model 802. The model 802 may similarly output normalized or scaled values.

The model 802 may also include one or more hidden layers 814. The one or more hidden layers 814 are configured to receive a result from the input layer 804 and transform it into a result that is provided to an output layer 816. In this manner, the model 802 may be able to determine a location of the one or more targets using a more complex decision boundary topography than the input layer 804 and/or the outer layer 816.

The output layer 816 may be configured to integrate the output(s) of the one or more hidden layers 814 to accomplish an overall task of the model 802. For example, the output layer 816 may include an output neuron 818 configured to output a location 820 of the one or more targets.

As introduced above, the input vector 810 comprises a plurality of phantom intersection points 826A-C that do not correspond to a location of a target and a plurality of intersection points 828A-F that correspond to the location of the target. Provided all these inputs, the target location model 802 is trained to resolve the location of the target.

In some examples, the target location model 802 can resolve a location of a target by recognizing how a pattern of variables appears at various distances from the target. Some examples of variables that can be recognized by the target location model 802 include locations of a plurality of intersection points, a maximum speed between two or more intersection points, an acceleration between a plurality of intersection points, or a path between two or more intersection points.

The pattern of variables can be irregular (e.g., statistically improbable) when it is sampled at a location that does not correspond to a target. For example, if two or more intersection points are spaced very far apart (e.g., 1 mile apart) within a short window of time (e.g., 10 seconds), it may be unlikely that these two or more intersection points correspond to the same target. The pattern can become more regular when it is sampled at a location that is close to a target. In this manner, the target location model 802 can determine a probability factor that indicates where one or more targets are likely located.

The AI system 800 may additionally or alternatively incorporate information from other suitable sources, which may be in a different format than the targeting data. For example, when the target location model 802 identifies the likely location 820 of one or more targets, the location 820 may be shared with an operator of the drone 112 of FIGS. 1 and 7. The drone operator can view aerial imagery of the environment 100 and confirm if the location is correct or incorrect. In some examples, the drone operator can move the output location if it is offset from a true location of the one or more targets, and/or lock the location to one or more targets (e.g., a moving vehicle or a person). The output location can additionally or alternatively be overlaid with aerial/satellite imagery, topographic maps, and/or other suitable information.

In some examples, the AI system 800 can use aerial imagery of the environment 100 as an image-based input vector 830 for the target location model 802. For example, the AI system 800 may include an image segmentation model 832 configured to partition the image data into a plurality of spatial areas each representing one or more targets. A centroid of each area may be fused with the intersections of the user-input-based feature vector 810 to determine the location 820 of the one or more targets.

The AI system 800 may additionally or alternatively include a target classification model 834 trained to determine, based at least upon the user inputs, a target classification 836 of the one or more targets. For example, the target classification model 834 may be configured to determine the target classification 836 based upon user-input image classification tags 838. The target classification model 834 may additionally or alternatively use the image input vector 830 to determine the target classification 836. For example, after using the image segmentation model 832 to partition the image data, a computer vision model 840 may be used to classify the contents of each segmented area of the image and provide this information as an input to the target classification model 834. In this manner, the AI system 800 may be configured to output a likely target classification 836 of the one or more targets (e.g., "ENEMY" or "FRIENDLY").

The location 820 and/or the target classification 836 may be output to any suitable device or devices. For example, the location 820 and/or the target classification 836 may be output for display to military leaders, emergency response coordinators, and others who may not be able to directly observe a field environment. In other examples, the location 820 and/or the target classification 836 may be output to a server computing device configured to develop and maintain a digital model of the field environment. In yet other examples, the location 820 and/or the target classification 836 may be output to one or more user devices (e.g., to the weapon 400 of FIG. 4 or the spotting scope 500 of FIG. 5).

In this manner, the artificial intelligence system may help to enhance users' situational awareness.

The location 820 output by the AI system 800 may additionally or alternatively be used as a source of information for navigation and/or localization. As introduced above, an initial location of a user can be determined using external sources of information (e.g., via GPS) to model one or more lines of sight. However, the location 820 determined for one or more targets may be used to determine a location of a user that is tagging the one or more targets. In this manner, the location of the user can be determined in examples where external location information (e.g., as determined via GPS) may be unavailable.

In some examples, the artificial intelligence system is configured to output the location 820 and the target classification 836 of the one or more targets with associated confidence values. For example, the confidence values may be output as a percentage score in a range of 0-100%, with 0% indicating a lowest likelihood that a predicted location and/or target classification is correct, and 100% indicating a highest likelihood that the predicted location and/or target classification is correct.

The confidence values may be weighted based on any suitable factors, such as the type of input, an age of the input, how many inputs agree or disagree, and a reliability of an individual or piece of equipment providing the input. For example, if the observer 102, the soldiers 106, and the drone 112 of FIG. 7 all tag the enemy firing position 104 as "ENEMY", the artificial intelligence system may classify the enemy firing position 104 as "ENEMY" with a confidence level of 99% or higher.

Targeting data provided by the soldiers 106 of FIGS. 1 and 7 may be weighted more heavily than data provided by the drone 112. For example, if the drone 112 tags the enemy firing position 104 as "FRIENDLY", but the soldiers 106 and the observer 102 tag the enemy firing position 104 as "ENEMY", the artificial intelligence system may still classify the enemy firing position 104 as "ENEMY" with a relatively high confidence interval (e.g., 75%).

As another example, targeting data may be assigned a weight that decays over time. For example, one or more inputs may have classified the enemy firing position 104 as "ENEMY". But, as of two days later, no additional inputs have been received. Accordingly, the artificial intelligence system may output a relatively low confidence value (e.g., 50%) that the enemy firing position 104 remains "ENEMY" as of 1400 h on Wednesday, as the target classification and/or location of the enemy firing position 104 may have changed since the last inputs were received.

In some examples, the targeting data may be assigned a weight that decays at a rate that is based at least upon a type of target being classified. For example, a confidence value associated with a location of a person (e.g., one of the soldiers 106) may decay more rapidly than a confidence value associated with a location of a building (e.g., a tower serving as the enemy sniper position 108 of FIG. 1), as the person is likely more mobile and has a less persistent location than the building.

The confidence value may be additionally or alternatively weighted based on how many inputs agree or disagree. For example, if one of the soldiers 106 tags the enemy firing position 104 as "FRIENDLY" and the other three soldiers 106 tag the enemy firing position 104 as "ENEMY", the artificial intelligence system may output a relatively low confidence value (e.g., 25%) that the enemy firing position 104 is "FRIENDLY", and a relatively high confidence value (e.g., 75%) that the enemy firing position 104 is "ENEMY".

As another example, the confidence value may be additionally or alternatively weighted based upon a reliability of an individual or piece of equipment providing the input(s) to the artificial intelligence system. For example, input from a drone that provides lower resolution images of an environment may be weighted less heavily than input from a drone that provides higher resolution images. Similarly, input from a soldier that has a history of misclassifying targets may be weighted less heavily than input from a soldier that has a history of correctly classifying targets. A target may additionally or alternatively have a decay rate that is weighted based upon the reliability of the input(s).

In some examples, a computing device may be configured to prompt a user to tag one or more targets. For example, if the artificial intelligence system outputs a confidence value for the location 820 and/or the target classification 836 that is below a threshold confidence value, a user may be prompted to provide one or more additional inputs, which can allow the artificial intelligence system to determine the location and/or the classification of the one or more targets more accurately.

Figure 9:
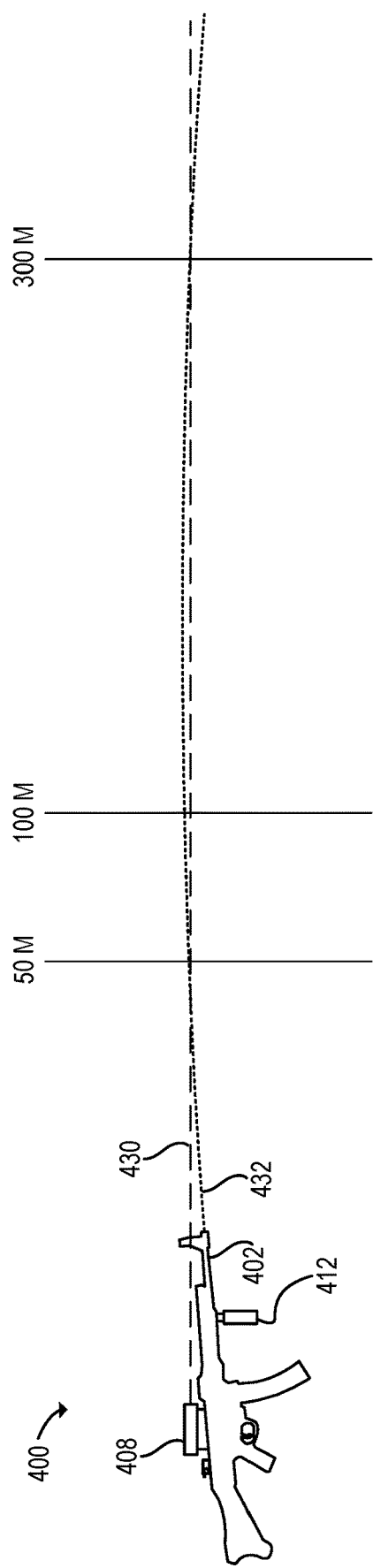
FIG. 9 shows the user device of FIG. 4 according to one example embodiment.

With reference now to FIG. 9, and as introduced above, a user's line of sight through a visual alignment aid may be offset from an actual linear orientation of a user device. For example, FIG. 9 shows a user's line of sight 430 through the scope 408 of FIG. 4, as well as a trajectory 432 of a round fired from the weapon 400. When the round is initially fired, the trajectory 432 rises towards the line of sight 430 of the scope. The trajectory 432 and the line of sight 430 may intersect at approximately 50 meters. The round then reaches an apex and begins to drop following a parabolic ballistic trajectory. As illustrated by example in FIG. 9, the round is above the line of sight 430 at approximately 100 meters and intersects the line of sight 430 a second time at approximately 300 meters, beyond which the round is below the line of sight.

The scope 408 may be "zeroed" by adjusting an angle of the scope 408 relative to the barrel 402 such that the line of sight 430 intersects the trajectory 432 at a desired distance. However, as the pose sensor may be coupled to the barrel 402 (e.g., in the foregrip 412), the angular orientation output by the pose sensor (which is indicative of the path of the barrel 402) may be different than an angular orientation of the line of sight 430. Accordingly, the AI system 800 of FIG. 8 may be trained to take this offset into account when determining the location 820 of the one or more targets (e.g., based on knowledge of weapon type, caliber, established ballistic trajectories, and sight adjustment preferences of a given user).

As introduced above, the pose of the line of sight may be determined using a factory calibration of the pose sensor. In other examples, the pose of the line of sight may be determined using a field calibration procedure based upon a known pose of the line of sight. Advantageously, the field calibration procedure may help compensate for some sources of potential error, such as offset error, repeatability error, scale factor error, misalignment error, noise, environmental sensitivity (e.g., due to thermal gradients), and error due to magnetic influences (e.g., due to nearby vehicles, equipment, or buildings).

Figure 10:
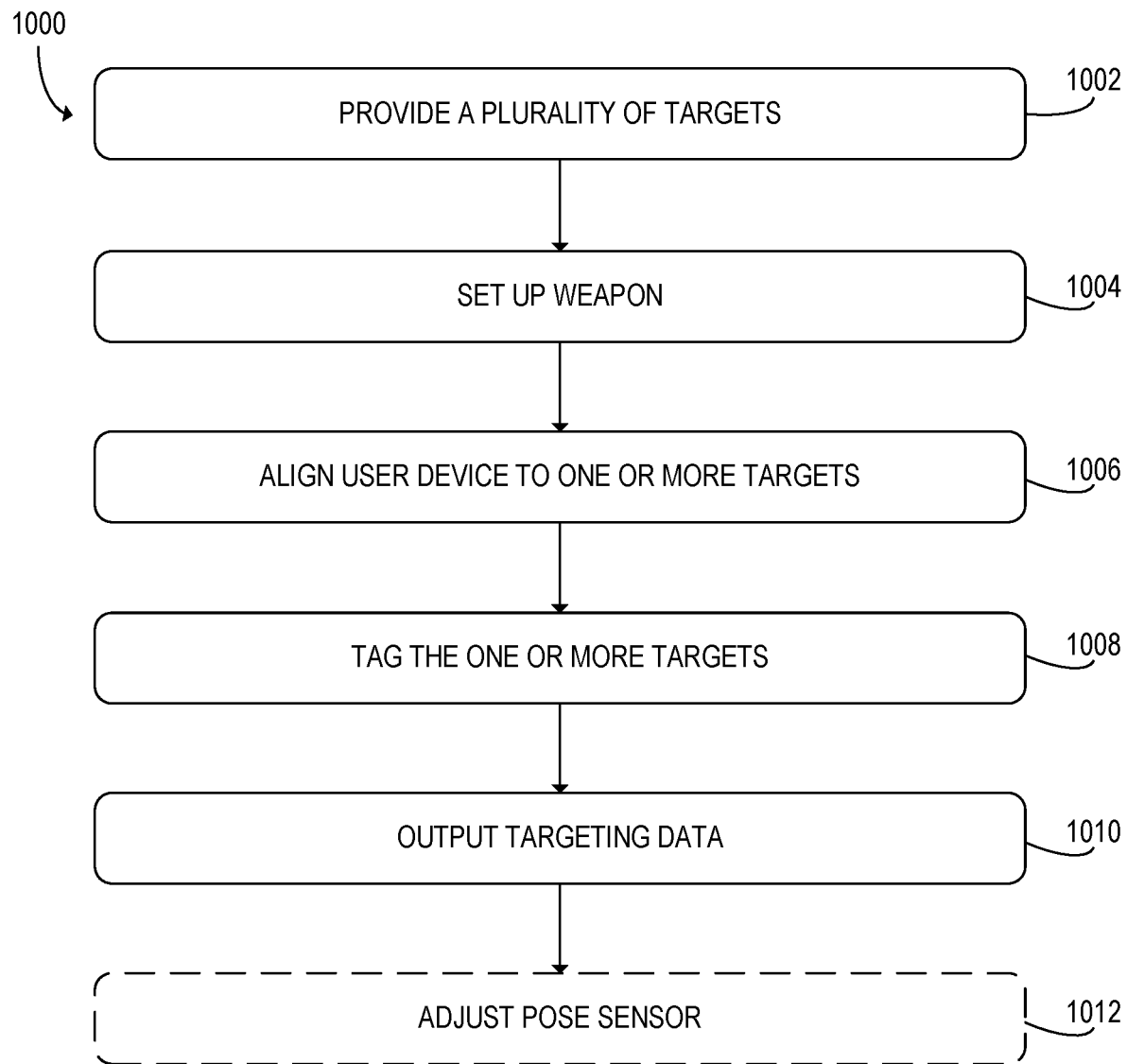
FIG. 10 shows a flowchart of an example method for calibrating a pose sensor according to one example embodiment.

With reference now to FIG. 10, a flowchart is illustrated depicting an example method 1000 for calibrating a pose sensor. The following description of method 1000 is provided with reference to the software and hardware components described above and shown in FIGS. 1-9 and 11-15. It will be appreciated that method 1000 also may be performed in other contexts using other suitable hardware and software components.

It will be appreciated that the following description of method 1000 is provided by way of example and is not meant to be limiting. It will be understood that various steps of method 1000 can be omitted or performed in a different order than described, and that the method 1000 can include additional and/or alternative steps relative to those illustrated in FIG. 10 without departing from the scope of this disclosure.

Figure 11:
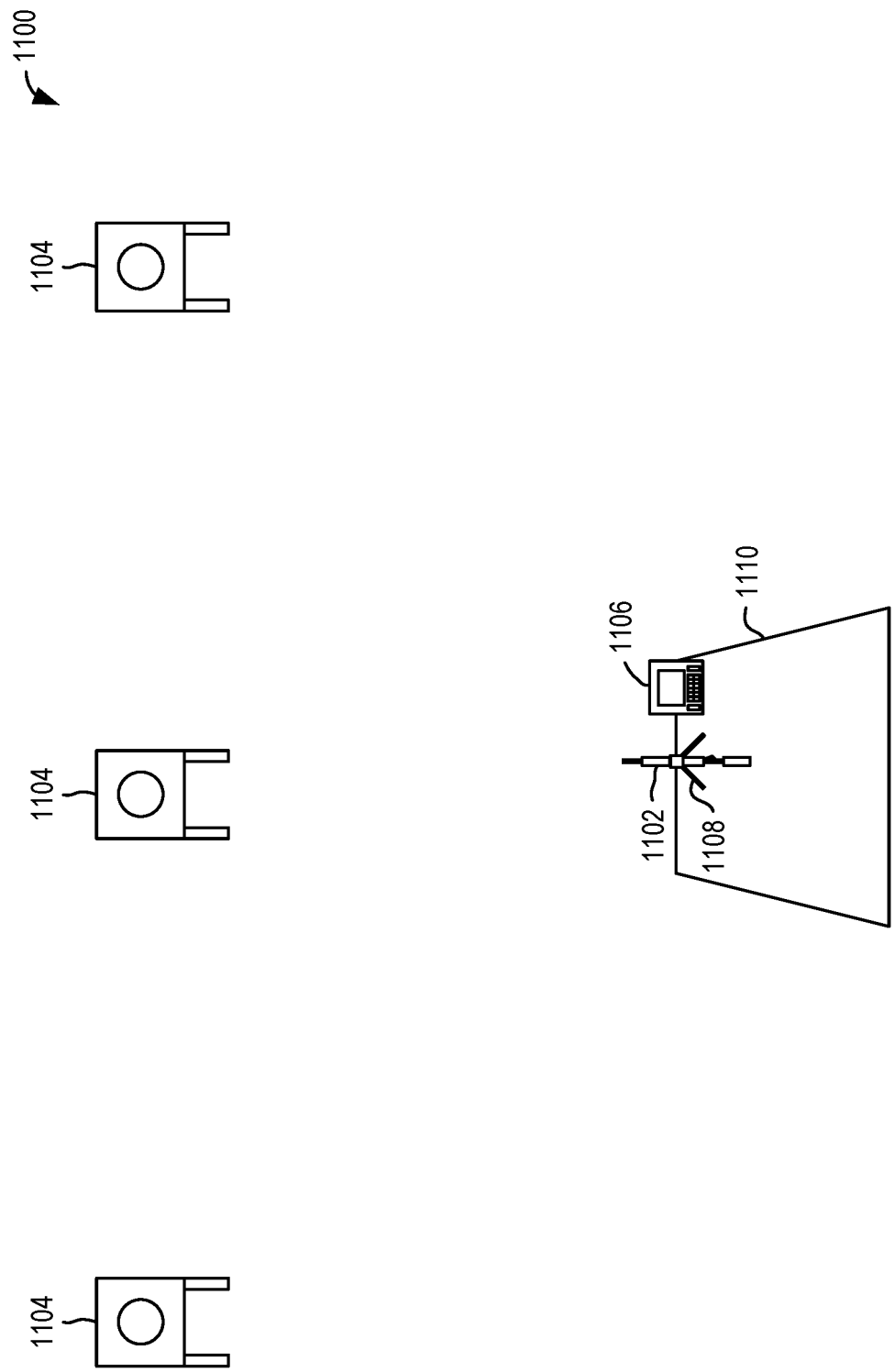
FIG. 11 shows one example of a field calibration environment for calibrating a pose sensor according to one example embodiment.

At 1002, the method 1000 includes providing a plurality of targets at known locations. FIG. 11 shows one example of a field calibration environment 1100 for calibrating a pose sensor coupled to a weapon 1102. The field calibration environment 1100 includes a plurality of targets 1104, each of which is set up at a known location. In some examples, the location of each of the targets 1104 may be uploaded to a field computing device 1106. In this manner, the computing device 1106 may know where the weapon 1102 is supposed to be pointed to tag each of the targets 1104.

With reference again to FIG. 10, at 1004, the method 1000 includes setting up a weapon at a known location. In the example of FIG. 11, the weapon 1102 may be provided on a fixed bipod support 1108 or at a known firing position, such as on a platform 1110. In this manner, the position of the weapon 1102 is also known, so the computing device 1106 may be able to determine a ground truth line of sight between the weapon 1102 and each of the targets 1104.

Next, at 1006, the method 1000 of FIG. 10 includes aligning a user device to one or more targets of the plurality of targets, and, at 1008, tagging the one or more targets. For example, an individual may aim the weapon 1102 of FIG. 11 at each target 1104 of the plurality of targets and provide a user input when the weapon 1102 is aligned with the target 1104. In some examples, this can occur while grouping and zeroing the weapon 1102. For example, the weapon 1102 or the computing device 1106 may be configured to determine that a round has been fired, which indicates that a person firing the weapon 1102 believes that it is properly aimed at one of the targets 1104.

At 1010, the method 1000 of FIG. 10 includes outputting targeting data comprising a pose of the user device determined by the pose sensor. In some examples, the targeting data may be output to a user, such as by displaying a visual indicator, flashing one or more lights, or causing a graphical user interface to be displayed via a display device (e.g., an HMD). In other examples, the targeting data may be output to a computing device, such as a computing device integrated with the weapon 1102 of FIG. 11, or the computing device 1106.

Next, at 1012, the method 1000 may include adjusting the pose sensor to bring the pose sensor into calibration. In some examples, large-scale adjustments may be performed mechanically. For example, the pose sensor may be physically rotated to compensate for an error in a reported orientation of the pose sensor that is greater than 1 MOA. Smaller adjustments (e.g., to compensate for an error less than 1 MOA) may be accomplished by modifying the output of the pose sensor with a digital offset value. In this manner, the pose sensor may be calibrated to a desired level of accuracy (e.g., less than one MOA).

Figure 12:
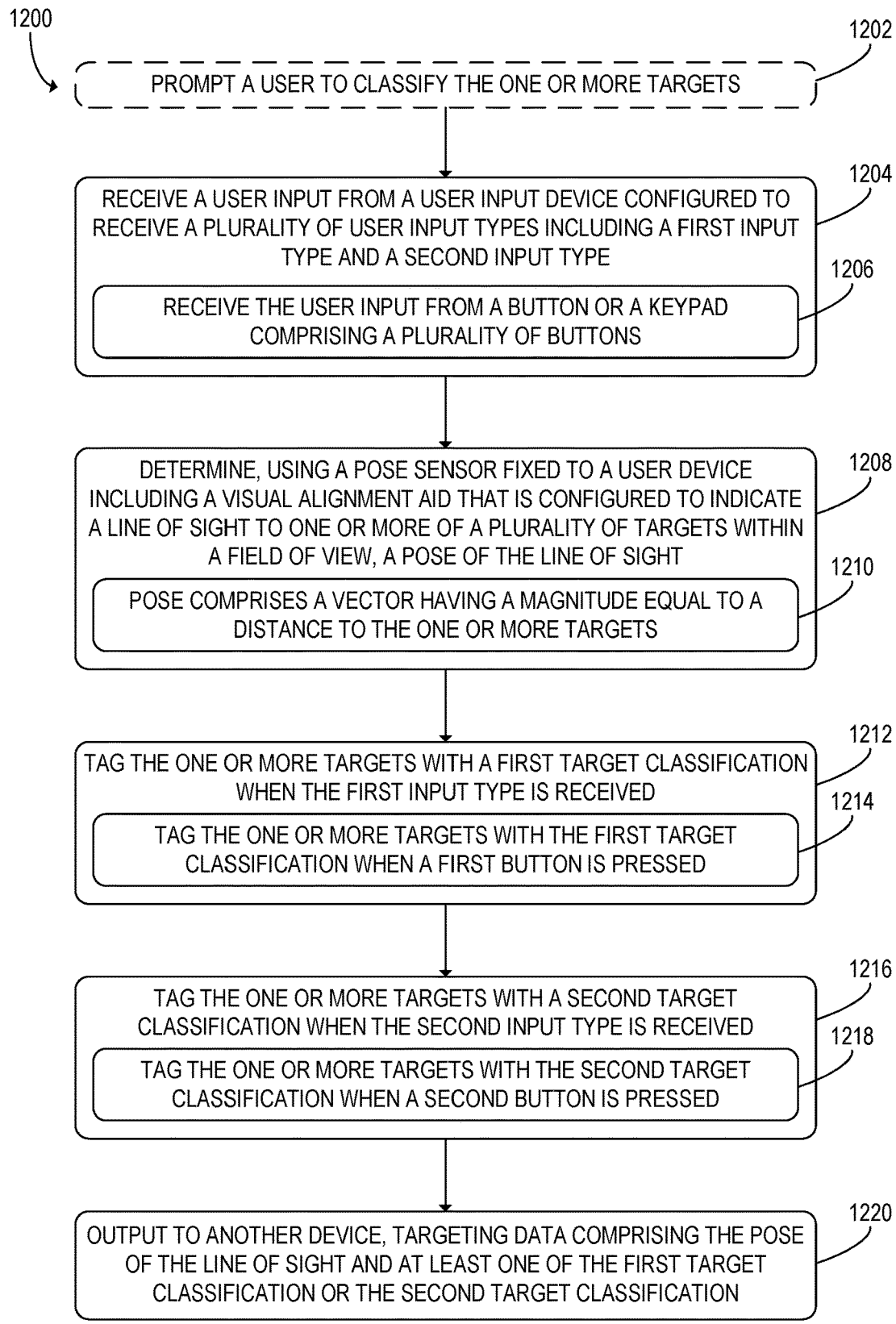
FIG. 12 shows a flowchart of another example method for classifying a target according to one example embodiment.

With reference now to FIG. 12, a flowchart is illustrated depicting an example method 1200 for classifying a target. The following description of method 1200 is provided with reference to the software and hardware components described above and shown in FIGS. 1-11 and 15. It will be appreciated that method 1200 also may be performed in other contexts using other suitable hardware and software components.

It will be appreciated that the following description of method 1200 is provided by way of example and is not meant to be limiting. It will be understood that various steps of method 1200 can be omitted or performed in a different order than described, and that the method 1200 can include additional and/or alternative steps relative to those illustrated in FIG. 12 without departing from the scope of this disclosure.

At 1202, the method 1200 may include prompting a user to classify one or more targets. At 1204, the method 1200 includes receiving a user input from a user input device configured to receive a plurality of user input types including a first input type and a second input type. At 1206, the method 1200 may include receiving the user input from a button or a keypad comprising a plurality of buttons.

At 1208, the method 1200 includes determining, using a pose sensor fixed to a user device including a visual alignment aid that is configured to indicate a line of sight to one or more of a plurality of targets within a field of view, a pose of the line of sight. As indicated at 1210, in some examples, the pose of the line of sight comprises a pose vector having a magnitude equal to a distance to the one or more targets. For example, the distance may be determined using a rangefinder as introduced above.

At 1212, the method 1200 includes tagging the one or more targets with a first target classification when the first input type is received. At 1214, the method 1200 may include tagging the one or more targets with the first target classification when a first button is pressed. At 1216, the method 1200 includes tagging the one or more targets with a second target classification when the second input type is received. At 1218, the method 1200 may include tagging the one or more targets with the second target classification when a second button is pressed. At 1220, the method 1200 includes outputting, to another device, targeting data comprising the pose of the line of sight and at least one of the first target classification or the second target classification.

In some embodiments, the methods and processes described herein may be tied to a computing system of one or more computing devices. In particular, such methods and processes may be implemented as a computer-application program or service, an application-programming interface (API), a library, and/or other computer-program product.

Figure 13:
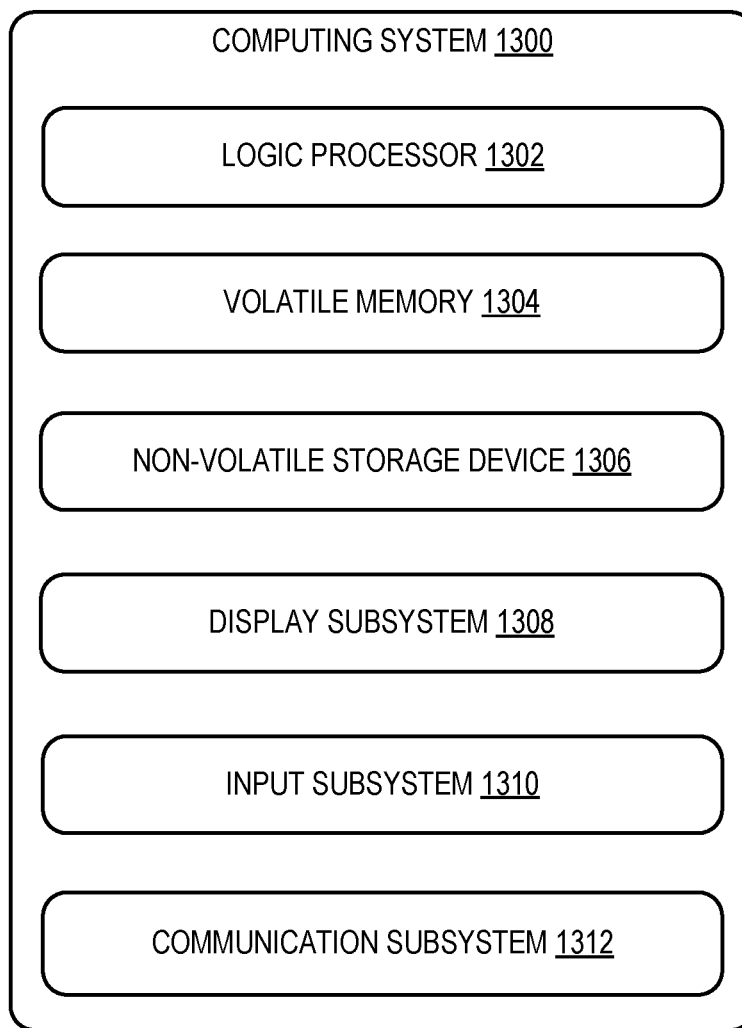
FIG. 13 shows a schematic diagram of an example computing system, according to one example embodiment.

FIG. 13 schematically shows an example of a computing system 1300 that can enact one or more of the devices and methods described above. Computing system 1300 is shown in simplified form. Computing system 1300 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices. In some examples, the computing system 1300 may embody the user device 202 of FIG. 2, the device 228 of FIG. 2, the computing device 300 of FIG. 3, the weapon 400 of FIG. 4, the spotting scope 500 of FIG. 5, the weapon 1102 of FIG. 11, or the field computing device 1106 of FIG. 11.

The computing system 1300 includes a logic processor 1302 volatile memory 1304, and a non-volatile storage device 1306. The computing system 1300 may optionally include a display subsystem 1308, input subsystem 1310, communication subsystem 1312, and/or other components not shown in FIG. 13.

Logic processor 1302 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 1302 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 1306 includes one or more physical devices configured to hold instructions executable by the logic processors to implement the methods and processes described herein. When such methods and processes are implemented, the state of non-volatile storage device 1306 may be transformed—e.g., to hold different data.

Non-volatile storage device 1306 may include physical devices that are removable and/or built-in. Non-volatile storage device 1306 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 1306 may include nonvolatile, dynamic, static, read/write, read-only, sequential-access, location-addressable, file-addressable, and/or content-addressable devices. It will be appreciated that non-volatile storage device 1306 is configured to hold instructions even when power is cut to the non-volatile storage device 1306.

Volatile memory 1304 may include physical devices that include random access memory. Volatile memory 1304 is typically utilized by logic processor 1302 to temporarily store information during processing of software instructions. It will be appreciated that volatile memory 1304 typically does not continue to store instructions when power is cut to the volatile memory 1304.

Aspects of logic processor 1302, volatile memory 1304, and non-volatile storage device 1306 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1300 typically implemented in software by a processor to perform a particular function using portions of volatile memory, which function involves transformative processing that specially configures the processor to perform the function. Thus, a module, program, or engine may be instantiated via logic processor 1302 executing instructions held by non-volatile storage device 1306, using portions of volatile memory 1304. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 1308 may be used to present a visual representation of data held by non-volatile storage device 1306. The visual representation may take the form of a GUI. As the herein described methods and processes change the data held by the non-volatile storage device, and thus transform the state of the non-volatile storage device, the state of display subsystem 1308 may likewise be transformed to visually represent changes in the underlying data. Display subsystem 1308 may include one or more display devices utilizing virtually any type of technology. Such display devices may be combined with logic processor 1302, volatile memory 1304, and/or non-volatile storage device 1306 in a shared enclosure, or such display devices may be peripheral display devices.

When included, input subsystem 1310 may comprise or interface with one or more user-input devices such as a keyboard, mouse, touch screen, or game controller. In some examples, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 1312 may be configured to communicatively couple various computing devices described herein with each other, and with other devices. Communication subsystem 1312 may include wired and/or wireless communication devices compatible with one or more different communication protocols. For example, the communication subsystem may be configured for communication via a wireless telephone network, or a wired or wireless local- or wide-area network. In some examples, the communication subsystem may allow computing system 1300 to send and/or receive messages to and/or from other devices via a network such as the Internet.

Figure 14:
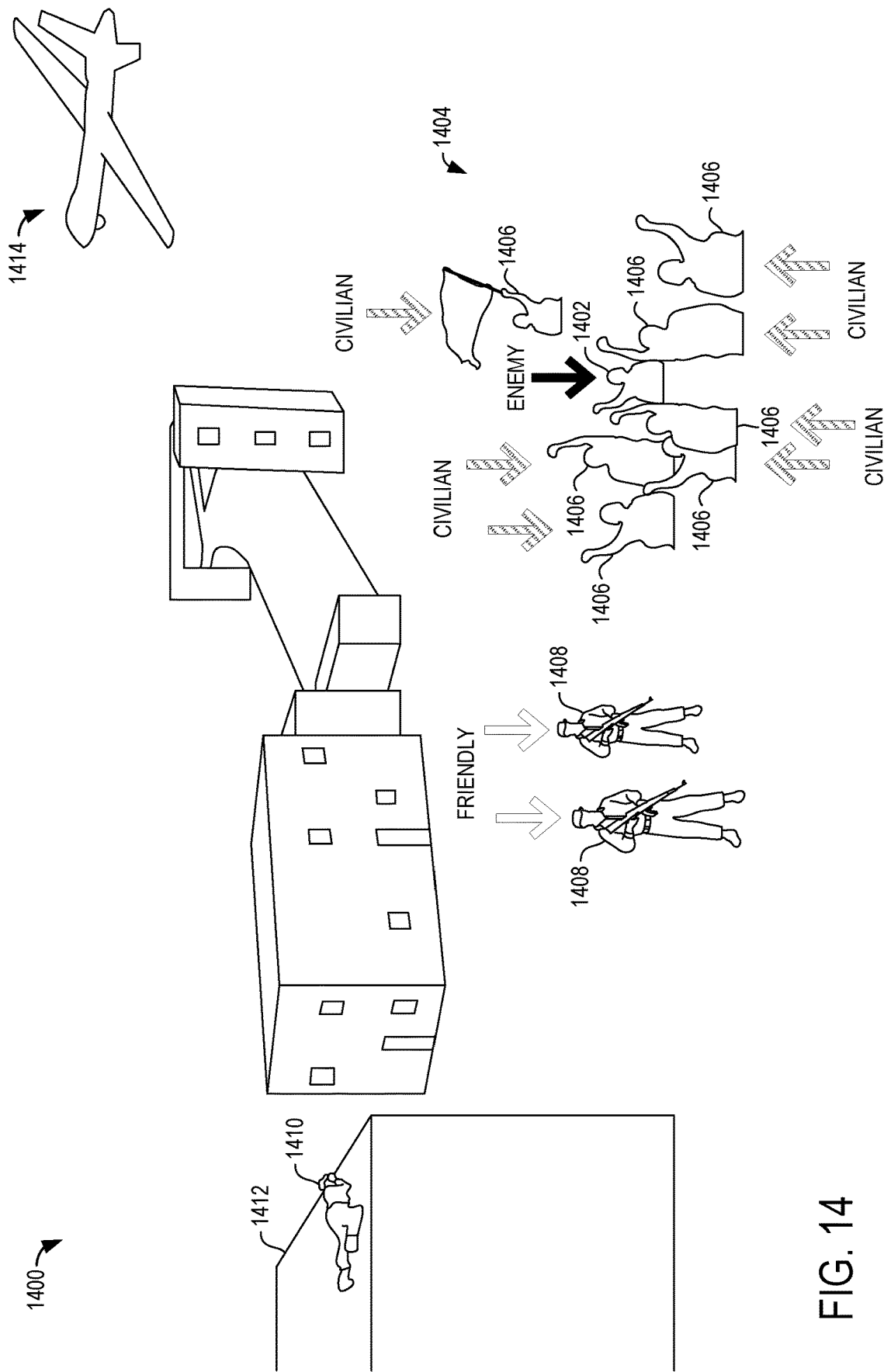
FIG. 14 shows another example of an environment including a plurality of targets according to one example embodiment.

FIG. 14 shows another example environment 1400 in which the embodiments disclosed herein may be applied. In the example environment 1400, an enemy guerilla 1402 is concealed within a crowd 1404 including peaceful civilian protesters 1406. In some examples, it can be difficult for individuals who are close to the crowd 1404, such as police officers 1408, to locate and classify the enemy guerilla 1402. However, an observer 1410 positioned on a rooftop 1412 may have a better view of the crowd 1404 and can employ any of the methods or devices disclosed herein to classify and locate the enemy guerilla 1402, the civilians 1406, and the police officers 1408. In the example of FIG. 14, the observer 1410 may tag the enemy guerilla 1402 with an "ENEMY" target classification. Each of the police officers 1408 may be tagged with a "FRIENDLY" target classification, and each of the civilians 1406 may be tagged with a "CIVILIAN" target classification.

The resulting targeting data can be provided to the police officers 1408. For example, the locations and target classifications can be displayed via a display device (e.g., an HMD). In other examples, the targeting data may be output to another computing device. The targeting data can additionally or alternatively be plotted on a map or augmented with aerial imagery of the environment 1400. For example, the targeting data can be overlaid with aerial image data provided by a surveillance drone 1414, which can be used to track the enemy guerilla 1402 within the crowd 1404.

Figure 15:
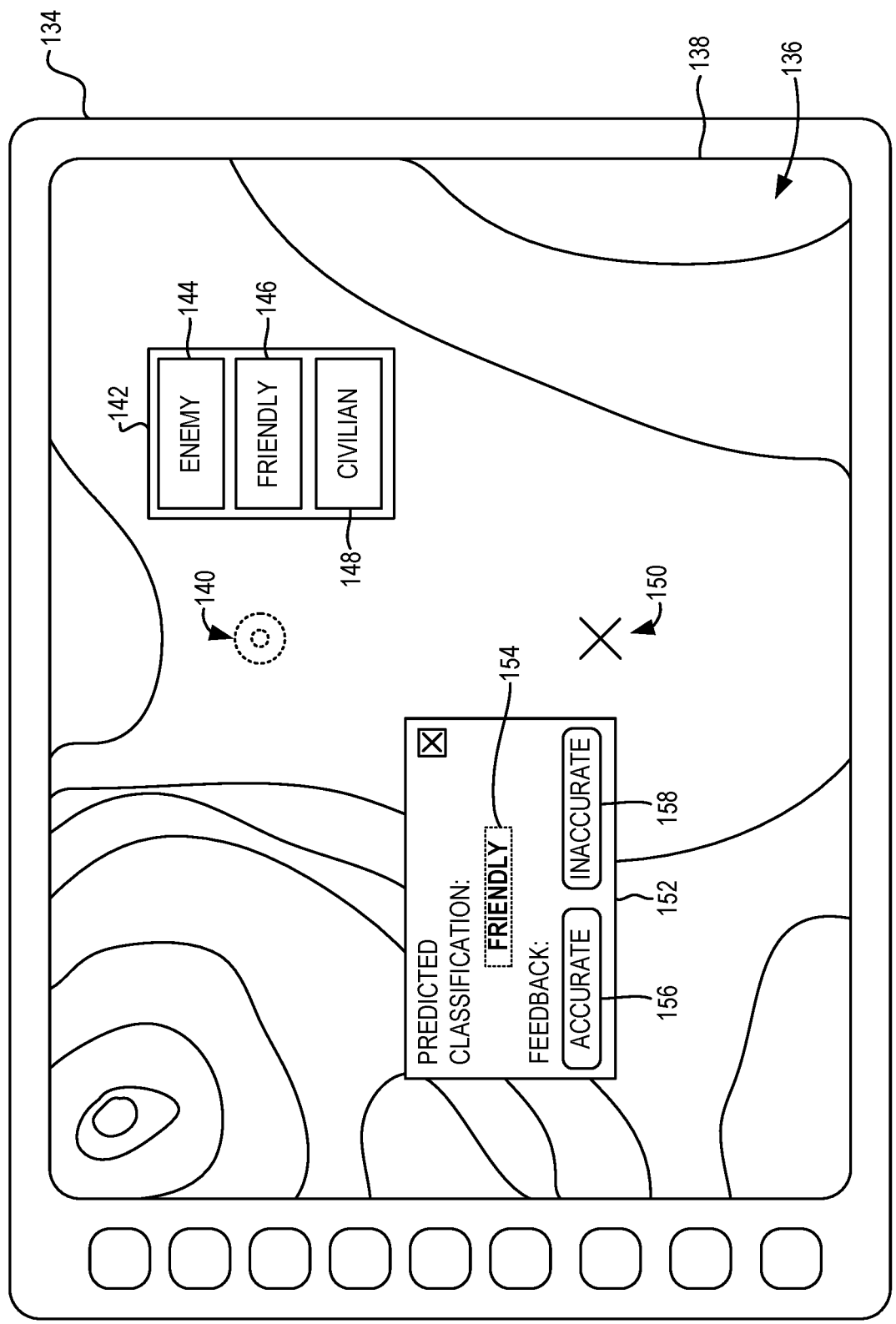
FIG. 15 shows one example of a computing device that may be used in the field environment of FIG. 1.

FIG. 15 depicts a computing device in the form of a tablet computing device 134 that can be used in the field environment 100 of FIG. 1. For example, the tablet computing device 134 can be carried by one of the soldiers 106. In other examples, the tablet computing device 134 can be located outside of the field environment 100 and operated by someone who is outside of the field.

In some examples, the tablet computing device 134 can serve as the user device 202 of FIG. 2. In other examples, the tablet computing device 134 can communicate with one or more remote devices to receive input from a user or provide output to the user.

In the example of FIG. 15, the tablet computing device 134 is displaying a contour map 136 that depicts the field environment 100 of FIG. 1. In other examples, the tablet computing device 134 may display an aerial image of the field environment 100 (e.g., an image or video feed from the friendly drone 112 or satellite image data).

The tablet computing device 134 is configured to receive one or more user inputs via a touch screen display 138. For example, a user may provide a touch input 140 on the map 136 to indicate a location of a target. The one or more user inputs may take any other suitable form. For example, the one or more user inputs may comprise a mouse click or a natural language input. In some examples, upon receiving the touch input 140, the tablet computing device 134 may display a selection menu 142 comprising a plurality of selection buttons 144, 146, and 148, which, when selected, classify the target as "ENEMY", "FRIENDLY", or "CIVILIAN", respectively. For a remote asset (e.g., the drone 112) that is in the field, the user input can be provided by a device that is outside of the field. Additional details regarding operation of a target classification system by a remote user that is not located in the field environment are provided in more detail below with reference to FIGS. 16-23.

The tablet computing device 134 may also be configured to receive feedback for an inferred location and/or classification of one or more targets. For example, the tablet computing device 134 may display an inferred location 150 of a target and a dialog box 152 including text 154 describing the target (e.g., "ENEMY"). For example, the dialog box 152 may include an "ACCURATE" selector button 156 that the user may select to indicate that the displayed location and/or classification is accurate. The dialog box 152 may also include an "INACCURATE" selector button 158. The touch input 140 and selection of one of the selection buttons 144, 146, or 148 may be provided following a selection of the "INACCURATE" selector button 158 to provide feedback for the displayed location and/or classification. It will be appreciated that the form factor of tablet computing device 134 is merely exemplary, and that, for example, the touch screen of tablet computing device 134 may be integrated into or removably coupled to a user device such as weapon 400 of FIG. 4 or spotting scope 500 of FIG. 5, in other embodiments.

Figure 16:
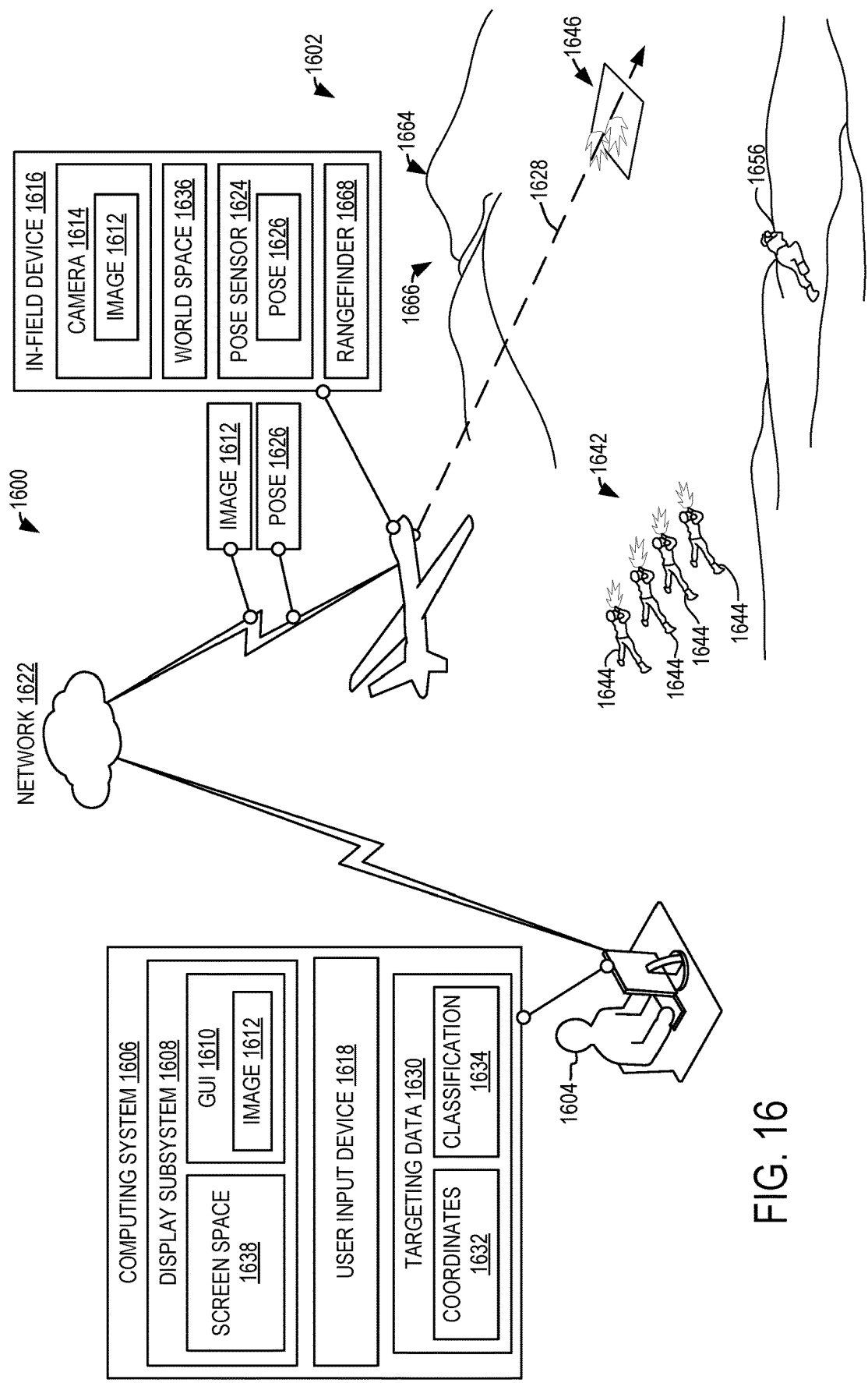
FIG. 16 shows a schematic diagram of another example system for classifying a target according to an example embodiment.

As introduced above, a target classification system can receive user inputs from a user who is not located in the field environment. FIG. 16 shows another example of a target classification system 1600, which provides data from a field environment 1602 to at least one remote user 1604 at a different location that is outside of the field environment, and which is configured to receive user input from the at least one remote user 1604.

The target classification system 1600 comprises a computing system 1606. In some examples, the computing system 1606 comprises a desktop computer operated by the user 1604. It will also be appreciated that the computing system 1606 may comprise any other suitable type of computing system. Other suitable examples of computing systems include, but are not limited to, a server computer, laptop computer and a tablet computer.

The computing system 1606 comprises a display subsystem 1608. In some examples, and as described in more detail below with reference to FIG. 17, the display subsystem 1608 may display a GUI 1610 comprising an image 1612 captured by a camera 1614 of an in-field device 1616. As described in more detail below, the image 1612 includes one or more targets.

In some examples, the in-field device 1616 comprises a vehicle, such as an aircraft (e.g., a drone), a truck, a car, a motorcycle, a watercraft, or a spacecraft. The vehicle may be manned (e.g., a piloted fighter jet) or unmanned (e.g., an unmanned aerial vehicle). In other examples, the in-field device 1616 comprises a weapon or an optical instrument. For example, the in-field device 1616 may comprise the weapon 400 of FIG. 4 or the spotting scope 500 of FIG. 5. In yet other examples, the in-field device may comprise a body camera or another device that is worn, carried, or operated by one or more individuals in the field environment 1602 and configured to capture the image 1612 and transmit the image 1612 to the computing system 1606, e.g., via a network 1622. In this manner, the remote user 1604 can observe footage from the camera 1614, which has a direct view of events occurring in the field environment 1602, and make targeting decisions. This may allow the remote user 1604 to assist individuals in the field environment 1602, who may be preoccupied with events occurring in the field and unable to provide targeting inputs, as well as any other remote users (e.g., a remote drone operator).

The computing system 1606 further includes a user input device 1618 configured to receive user input corresponding to locations in the image 1612 displayed on the display subsystem 1608. Briefly, the computing system 1606 is configured to receive a user input from the user input device 1618 indicating a location of the one or more targets in a screen space coordinate system 1638 of the display subsystem 1608. Location information is determined for the one or more targets in a world space coordinate system 1636 of the in-field device 1616. To determine the location information in the world space 1636, the computing system 1606 is configured to receive, from a pose sensor 1624 of the in-field device 1616, a pose 1626 of the camera 1614. The pose 1626 of the camera 1614 and the location of the one or more targets in the screen space 1638 are used to trace a ray 1628 between the camera 1614 and the one or more targets in the world space 1636. Coordinates 1632 of the one or more targets in the world space 1636 are generated using at least a position of the camera 1614 and an orientation of the ray 1628. The computing system 1606 is further configured to determine target classification information for the one or more targets. The target classification information 1634 is determined by tagging the one or more targets with a first target classification when the user input indicates a first input type, and tagging the one or more targets with a second target classification when the user input indicates a second input type. The computing system 1606 outputs targeting data 1630 comprising the coordinates 1632 of the one or more targets in the world space 1636 and the target classification information 1634. Additional aspects of the computing system 1606 are described in more detail above with reference to FIG. 13.

Figure 17A:
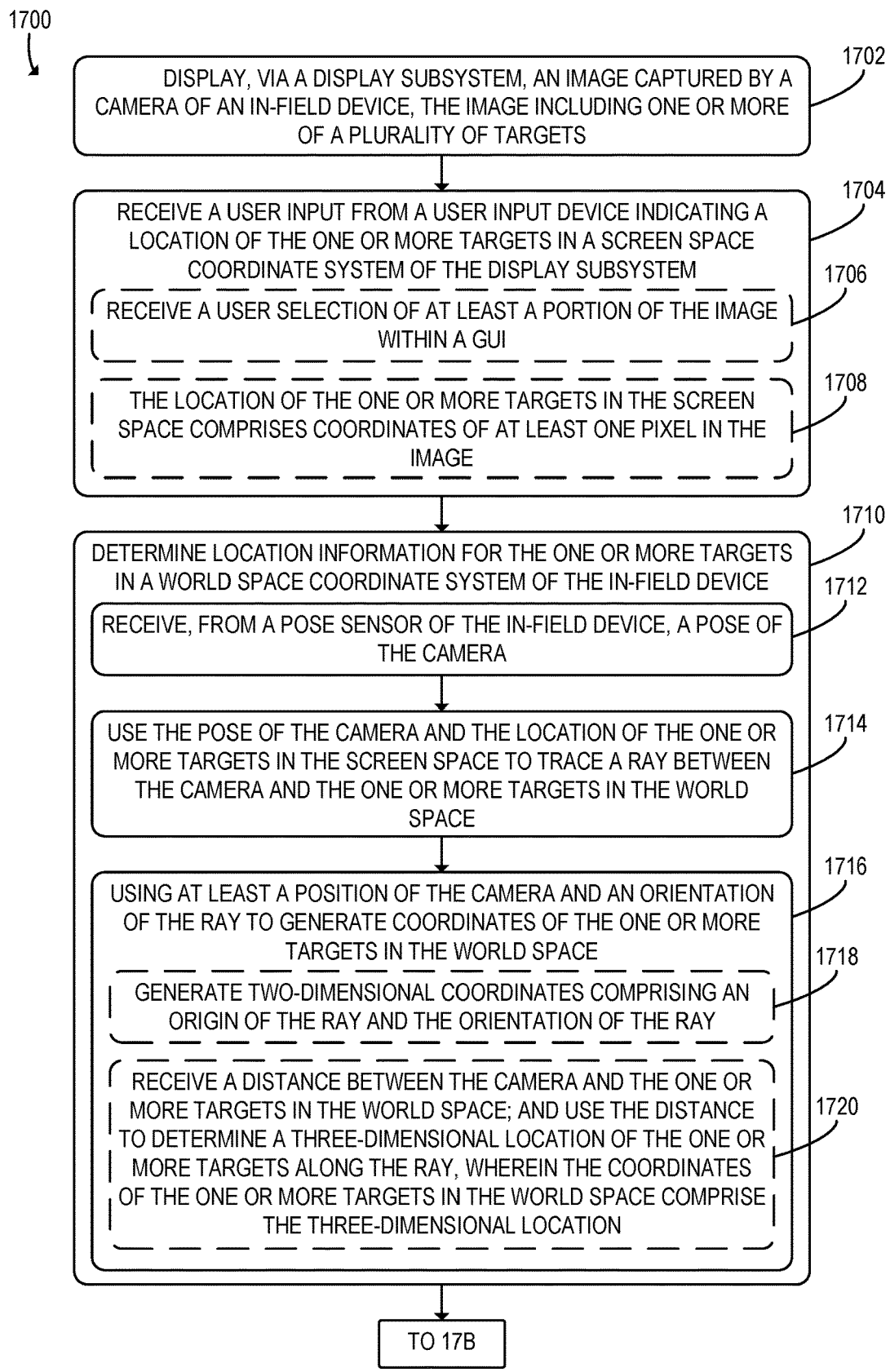
FIGS. 17A-B show a flowchart of yet another example method for classifying a target according to an example embodiment.
Figure 17B:
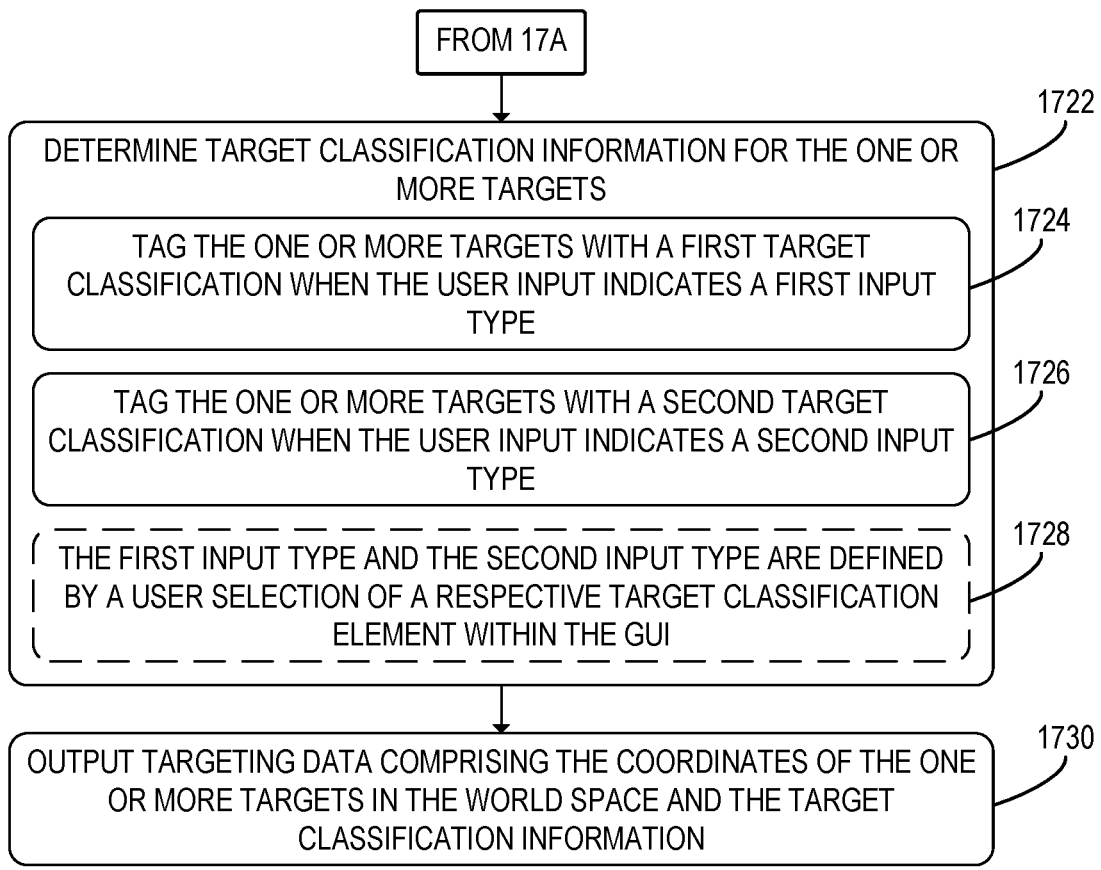

With reference now to FIGS. 17A-B, a flowchart is illustrated depicting an example method 1700 for classifying a target. The following description of method 1700 is provided with reference to the software and hardware components described above and shown in FIGS. 1-16 and 18-23. For example, the method 1700 may be implemented at the computing system 1606. It will be appreciated that method 1700 also may be performed in other contexts using other suitable hardware and software components.

It will be appreciated that the following description of method 1700 is provided by way of example and is not meant to be limiting. It will be understood that various steps of method 1700 can be omitted or performed in a different order than described, and that the method 1700 can include additional and/or alternative steps relative to those illustrated in FIGS. 17A-B without departing from the scope of this disclosure.

Figure 18:
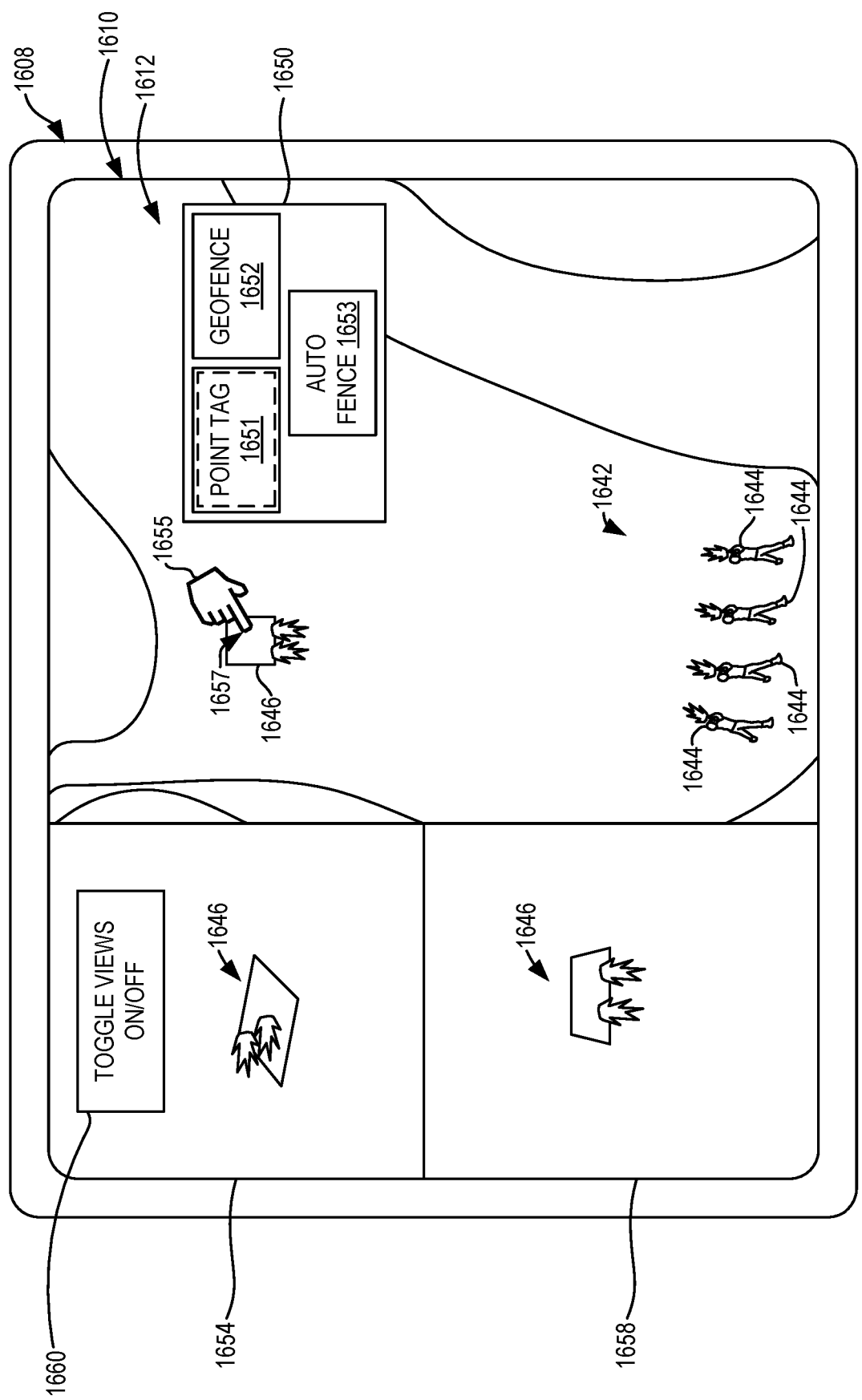
FIG. 18 shows one example of a GUI that may be used in the example system of FIG. 16 to receive a user selection of at least a portion of an image according to an example embodiment.

With reference to FIG. 17A, at 1702, the method 1700 comprises displaying, via a display subsystem, an image captured by a camera of an in-field device, the image including one or more of a plurality of targets. FIG. 18 shows the GUI 1610 of FIG. 16 as displayed by a display subsystem 1608, including the image 1612 of the field environment 1602. The image 1612 includes a plurality of targets in the in-field environment 1602, including a team 1642 of four soldiers 1644 and a machine gun nest 1646.

With reference again to FIG. 17A, at 1704, the method 1700 comprises receiving a user input from a user input device indicating a location of the one or more targets in a screen space coordinate system of the display subsystem. In some examples, as indicated at 1706, receiving the user input comprises receiving a user selection of at least a portion of the image within the GUI.

The user selection may be provided in any suitable manner. For example, aspects of both the user input device 1618 of FIG. 16 and the display subsystem 1608 can be implemented in a touch screen display, and the user selection may comprise a touch input (e.g., a tap with a finger or stylus) at a location within the image 1612. It will also be appreciated that the user input device 1618 may comprise any other suitable type of user input device. Other suitable examples of user input devices include, but are not limited to, a mouse, a keyboard, one or more buttons, a microphone, and a camera.

In the example of FIG. 18, the user selection comprises a point input (e.g., as provided by a single tap or click). In other examples, and as described in more detail below with reference to FIGS. 19-20, the user selection comprises an area selection. For example, the user selection may comprise a geofence around at least a portion of the image 1612 corresponding to a boundary surrounding a target.

In some examples, when or more different modes of providing input are available, the GUI 1610 includes a selection menu 1650 including selection elements 1651-1653 configured to receive a user selection of a respective input method. In the example of FIG. 18, a first selection element 1651 labeled "POINT TAG" is selected, as indicated by dashed lines within the first selection element 1651. Based upon the selection of the first selection element 1651, an optional point selection cursor 1655 is displayed that indicates a point location 1657 corresponding to one or more targets. In the example of FIG. 18, the point location 1657 corresponds to the location of the machine gun nest 1647.

Figure 19:
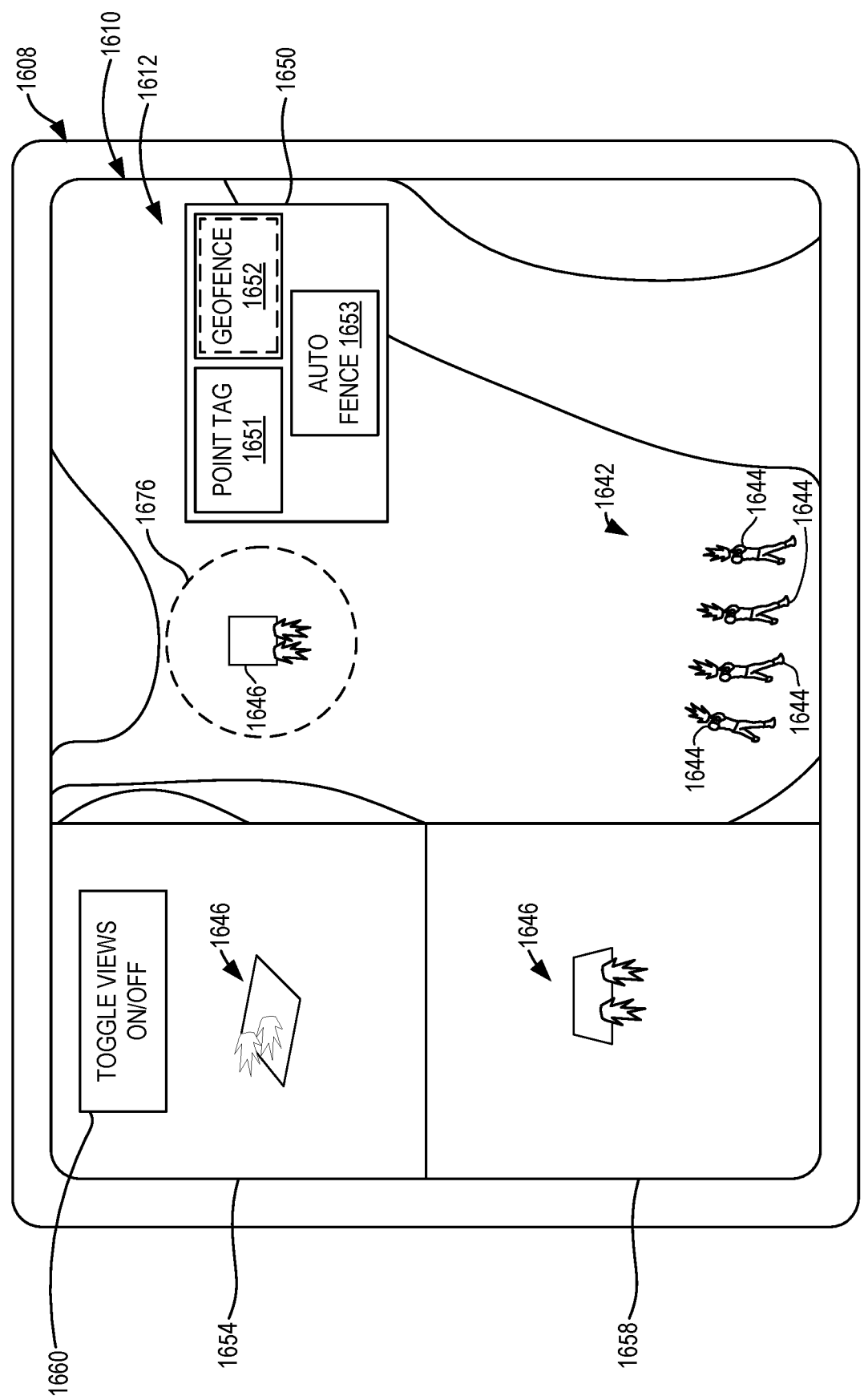
FIG. 19 shows another example implementation of the GUI of FIG. 18 to receive a user selection of at least a portion of an image according to an example embodiment.

As another example, a second selection element 1652 labeled "GEOFENCE" is selected in FIG. 19, as indicated by dashed lines within the second selection element 1652. Based upon the selection of the second selection element 1652, the user may draw a geofence 1676 around the one or more targets in the screen space. In some examples, the geofence 1676 may be drawn by the user as a freehand-drawn boundary. In other examples, the geofence 1676 corresponds to a defined shape (e.g., a circle or a square).

Figure 20:
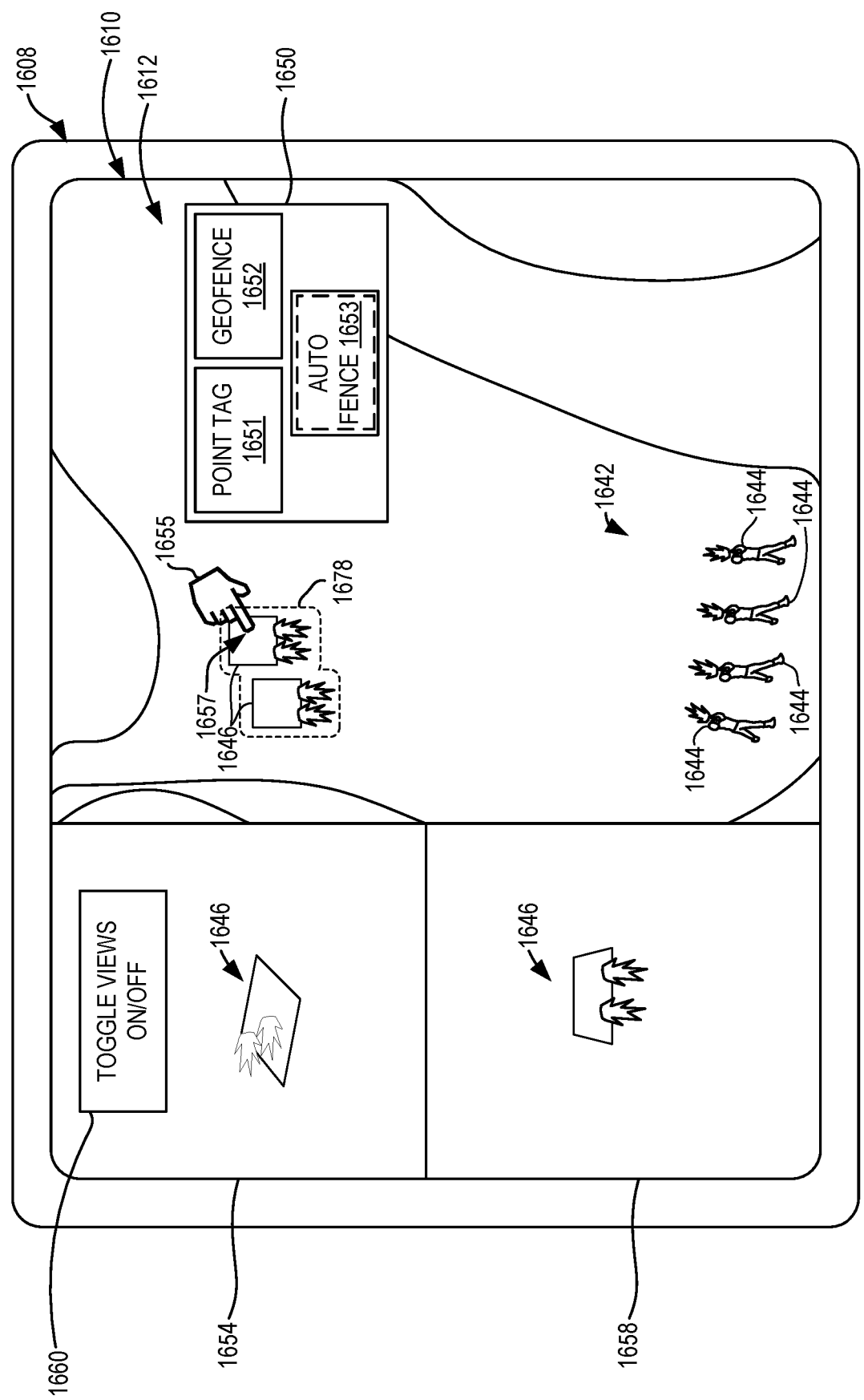
FIG. 20 shows yet another example implementation of the GUI of FIG. 18 to receive a user selection of at least a portion of an image according to an example embodiment.

In other examples, a geofence may be drawn automatically around an object in the image 1612 upon selection of at least a portion of the image 1612 corresponding to the location of the object in the image. For example, in FIG. 20, a third selection element 1653 labeled "AUTO FENCE" is selected, as indicated by dashed lines within the third selection element 1653. Based upon the selection of the third selection element 1653, the user may provide a point selection (e.g. via cursor 1655) at a location within the image 1612. Based on the point selection a geofence 1678 is programmatically generated around an area of the image 1612 comprising the location 1657 of the point selection. In some examples, the geofence 1678 is generated using an image segmentation algorithm to identify boundaries of an object (e.g., the machine gun nest 1646) at the location 1657 of the point selection. In FIG. 20, the example battlefield has been augmented to include a second machine gun nest for the purpose of illustration, and the geofence 1678 has been drawn around the two machine gun nests automatically, as shown in dashed lines. The image segmentation algorithm determined that the two related machine gun nests 1646 in close proximity (e.g., a threshold proximity) should be grouped together via the geogence 1678.

In some examples, the GUI 1610 may present the user with one or more additional images of the field environment 1602, which may show at least a portion of the field environment from one or more different perspectives than the image 1612. For example, upon receiving the user selection of the machine gun nest 1646, the computing system may display a first additional view pane 1654 showing the machine gun nest 1646 from the perspective of a forward observer 1656 (shown in FIG. 16) and a second additional view plane 1658 showing the machine gun nest 1646 from the perspective of the team of soldiers 1642. The user may additionally or alternatively toggle the display of the additional view panes on or off by selecting a view toggle selection element 1660.

In this manner, the user 1604 may view the field environment from a plurality of different perspectives to make an accurate determination of a location and/or classification of the target(s), which provides an accurate dataset for downstream processing and interpretation by users. Further, by displaying the additional view panes responsive to a user input, the computing system 1606 may refrain from computationally intensive image processing until the presentation of the additional view panes is requested.

It will also be appreciated that any or all aspects of the GUI 1610 presented herein may be customized by the user 1604 or adapted for use in different scenarios. For example, a remote user with a desktop computer and a large display area may be able to view more images and selection options than a user located in the field environment and using a mobile device, who may choose to view a concise summary of the targeting data 1630.

With reference again to FIG. 17A, at 1708, the location of the one or more targets in the screen space may comprise coordinates of at least one pixel in the image. For the point selection in the example of FIG. 18, the location in the screen space may comprise coordinates of a pixel at the point location 1657.

At 1710, the method 1700 comprises determining location information for the one or more targets in a world space coordinate system of the in-field device. As introduced above and as indicated at 1712, the location information is determined by receiving, from a pose sensor of the in-field device, a pose of the camera. For example, the computing system 1606 of FIG. 16 may receive pose 1626 of the camera 1614 from the pose sensor 1624 of the in-field device 1616. As introduced above, the pose 1626 comprises a position of the camera 1614 and an orientation of the camera 1614. In this manner, the pose sensor 1624 may be analogous to the pose sensor 306 of FIG. 3. For example, the pose sensor 1624 may comprise one or more of an IMU, an accelerometer, a gyroscope, a compass, a GPS sensor, or an altimeter.

At 1714, the pose of the camera and the location of the one or more targets in the screen space are used to trace a ray between the camera and the one or more targets in the world space. For example, FIG. 16 shows one example of a ray 1628 that may be generated between the camera 1614 and the machine gun nest 1646. The ray 1628 originates at a real-world location of the camera 1614, which can be determined using the pose sensor 1624. An orientation of the ray may be determined using at least the orientation of the camera 1614 as determined using the pose sensor 1624.

In some examples, the one or more targets selected by the user are aligned to an optical axis of the camera, which may correspond to the center of the image 1612. The optical axis of the camera may have a quantified relationship to the pose 1626 of the camera 1614. Accordingly, when the one or more targets selected by the user are located at the center of the image 1612, the ray may be traced with an orientation that is aligned to the optical axis.

In other examples, the ray may be offset from the optical axis of the camera. The orientation of the ray can be calculated using the orientation of the optical axis and the displacement (in the screen space) between the user-selected target(s) and the optical axis. The displacement may be associated with an angular distance value, which may be established by tracking the orientation of the optical axis over two or more image frames.

With reference again to FIG. 17A, at 1716, the method 1700 includes using at least a position of the camera and the orientation of the ray to generate coordinates of the one or more targets in the world space. In some examples, coordinates in the screen space 1638 of FIG. 16 can be transformed into the world space 1636 by aligning the image 1612 with a map or other geographic representation of the world space 1636.

Figure 21:
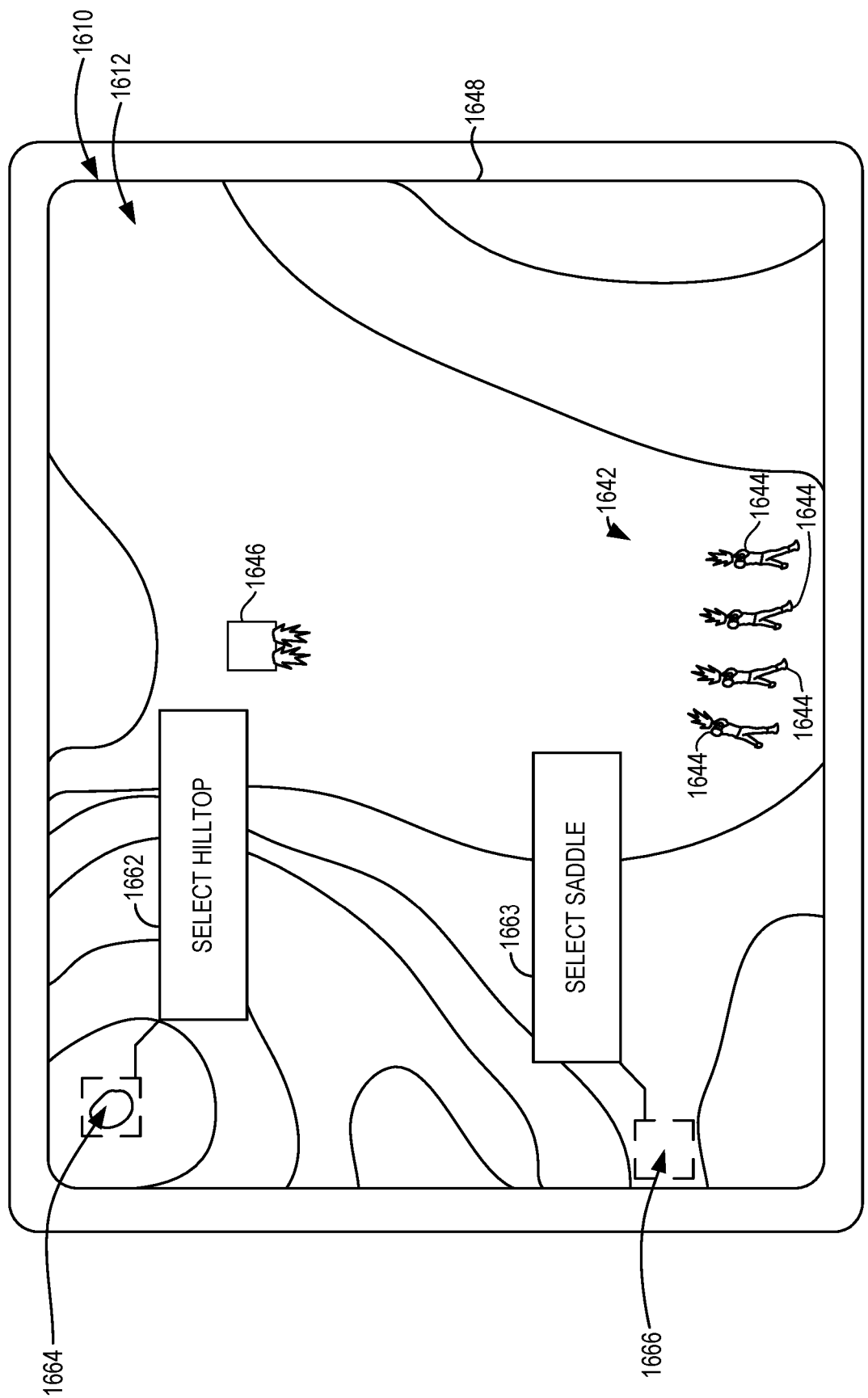
FIG. 21 shows another example implementation of the GUI of FIG. 18 to align the image to a real-world environment according to an example embodiment.

For example, and with reference to FIG. 21, the user 1604 may be prompted to select an area of the image 1612 corresponding to a geographic feature having coordinates available to the computing system 1606. For example, the computing system 1606 may display a prompt 1662 to select at least a portion of the image 1612 corresponding to a location of hilltop 1664, and a prompt 1663 to select at least a portion of the image 1612 corresponding to a location of saddle 1666. Coordinates of the hilltop 1664 and the saddle 1666 in the real world may be available from a topographic map or survey data, and the user input locations (in the screen space coordinate system) can be used to align the screen space to the world space.

In some examples, correspondence between the screen space and the world space may be elastic. Various sources of error may be found in both the screen space and the world space. For example, the representation of the real world (e.g., a digital map) may have some baseline distortion (e.g., projection distortion or survey error), the image 1612 may be distorted (e.g., by a camera lens), and/or the user input may be erroneous. Advantageously, incorporating elasticity between the screen space and the world space may increase the accuracy of the mapping of the image to the real world.

Referring again to FIG. 17A, in some examples, and as indicated at 1718, generating the coordinates of the one or more targets in the world space may comprise generating two-dimensional (2D) coordinates comprising an origin of the ray and the orientation of the ray. For example, 2D polar coordinates of the machine gun nest 1646 may comprise the origin of the ray 1628 and the orientation of the ray (e.g., the position of the camera 1614 and the bearing from the camera to the machine gun nest). In the 2D polar coordinate system, a radial coordinate of the machine gun nest 1646 may be located anywhere along the ray 1628.

In other examples, as indicated at 1720, generating the coordinates of the one or more targets in the world space may comprise generating three-dimensional (3D) coordinates of the one or more targets. The 3D coordinates may be generated by receiving a distance between the camera 1614 and the one or more targets in the world space. For example, the distance may be received from a rangefinder 1668 (e.g., a depth camera or a time-of-flight sensor) of the in-field device 1616. The distance may be used to determine the radial location of the machine gun nest 1628 along the ray 1642, thus defining the 3D location of the machine gun nest 1628.

Referring now to FIG. 17B, at 1722, the method 1700 includes determining target classification information for the one or more targets. The target classification information is determined by, at 1724, tagging the one or more targets with a first target classification when the user input indicates a first input type, and at 1726, tagging the one or more targets with a second target classification when the user input indicates a second input type. As indicated at 1728, and as described in more detail below with reference to FIG. 22, the first input type and the second input type may be defined by a user selection of a respective target classification element within the GUI 1610.

Figure 22:
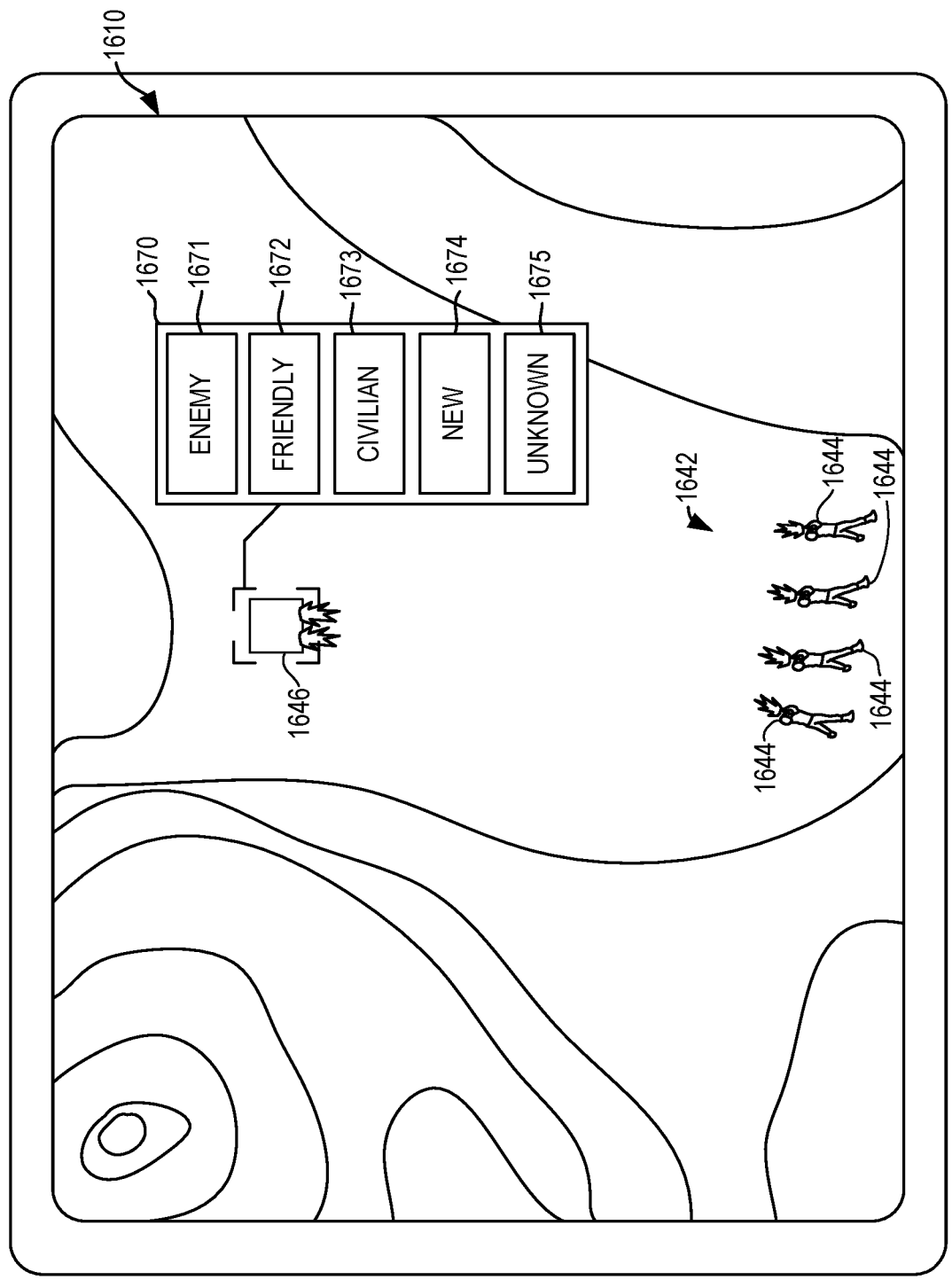
FIG. 22 shows another example implementation of the GUI of FIG. 18 including a plurality of target classification elements according to an example embodiment.

FIG. 22 shows a plurality of target classification elements that may be displayed via the GUI 1610. Upon receiving a user selection of the machine gun nest 1646 as a target, a dialog box 1670 may be displayed. The dialog box 1670 includes a first target classification element 1671 in the form of a user-selectable button labeled "ENEMY". The first target classification element is configured to receive a user selection indicating a first target classification (e.g., "enemy"). The dialog box 1670 also includes a second target classification element 1672 in the form of a user-selectable button labeled "FRIENDLY". The second target classification element is configured to receive a user selection indicating a second target classification (e.g., "friendly"). The dialog box 1670 may further include one or more additional target classification elements corresponding to one or more additional classifications. For example, the dialog box 1670 may include a third target classification element 1673 labeled "CIVILIAN".

Figure 23:
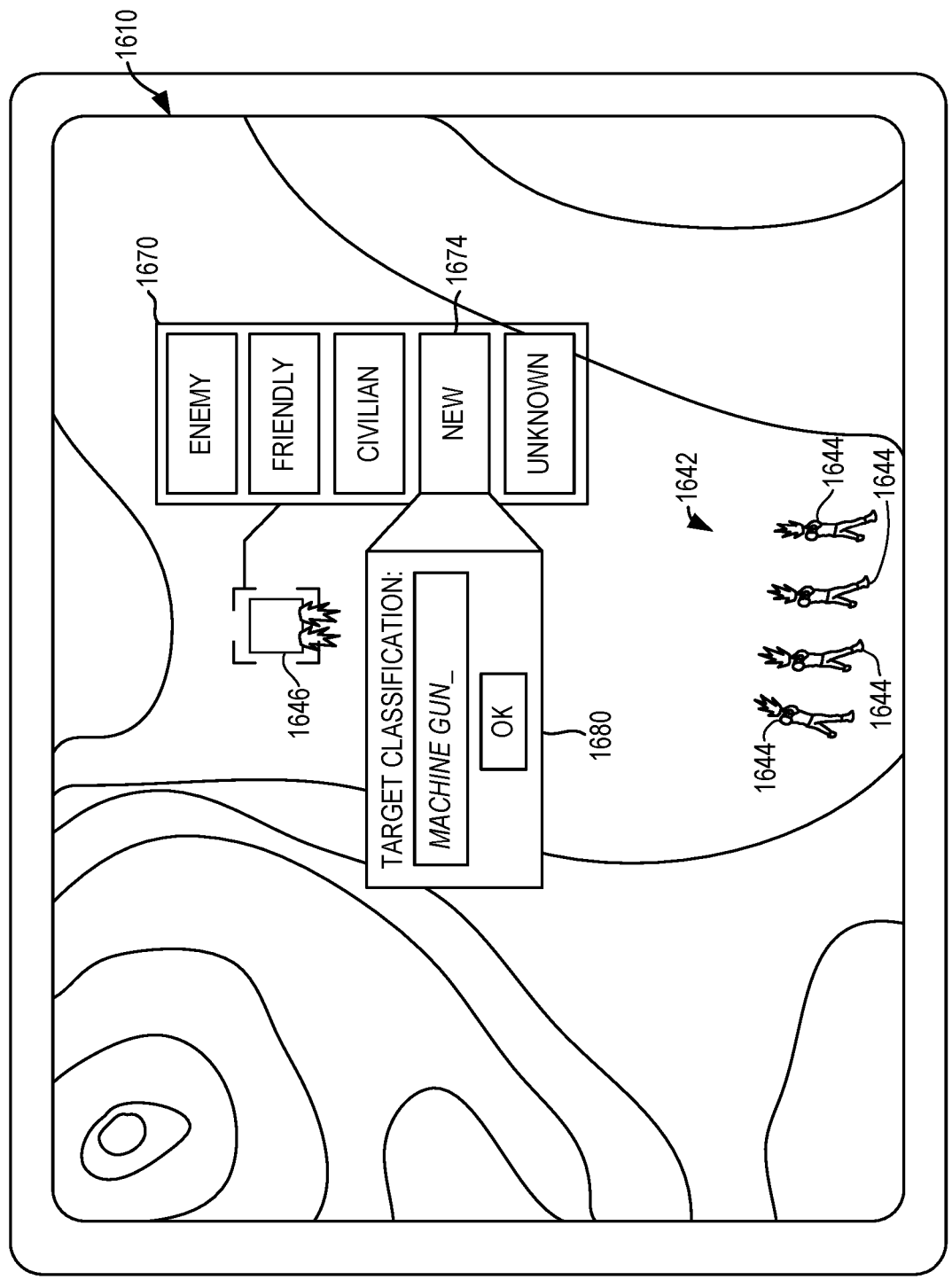
FIG. 23 shows the GUI of FIG. 22, including a user-input target classification prompt, according to an example embodiment.

The dialog box 1670 may additionally or alternatively include a "NEW" target classification element 1674, which the user may select to create a new target classification, and/or an "UNKNOWN" target classification element 1675, which the user may select when the user does not know how to classify the target or to mark the target as unclassified. As shown in FIG. 23, upon receiving a user selection of the "NEW" target classification element 1674, the GUI 1610 presents a custom target classification input prompt 1680. The custom target classification input prompt 1680 is configured to receive a user-input target classification type 1682, such as a text-input classification received via a keyboard or an NLP interface. As shown in FIG. 23, the user-input target classification type is "MACHINE GUN".

In some examples, and with reference again to FIG. 22, the computing system 1606 is configured to model a probabilistic location of a target. For example, the machine gun nest 1646 may be previously classified as an enemy. Based upon a confidence level of the classification, and a modeled location of the machine gun nest 1646, the computing system 1606 may display the first target classification element 1671 ("ENEMY"). In other examples, the computing system 1606 may display a plurality of target classification elements, and prioritize the display of the target classification elements based upon the confidence level of a previous classification, and a modeled location of the previously classified target. For example, the computing system 1606 may display the first target classification element 1671 ("ENEMY") at the top of the dialog box 1670.

With reference again to FIG. 17B, at 1730, the method 1700 includes outputting targeting data comprising the coordinates of the one or more targets in the world space and the target classification information. In some examples, the targeting data 1630 is output to a local memory or processor on the computing system 1606. In other examples, the targeting data is output to another device. For example, and as described above with reference to FIG. 6, the targeting data may be output to a server computing device (e.g., at a data center or at a network edge location) configured to further process the targeting data. In this manner, the computing system 1606 can mitigate challenges associated with communicating targeting information out of the field environment. The computing system 1606 further allows one or more remote users 1604 to assist people in the field environment or one or more other remote users (e.g., a remote drone operator), augmenting situational awareness while allowing others to focus on their operational tasks.

It will be understood that the configurations and/or approaches described herein are exemplary in nature, and that these specific embodiments or examples are not to be considered in a limiting sense, because numerous variations are possible. The specific routines or methods described herein may represent one or more of any number of strategies. As such, various acts illustrated and/or described may be performed in the sequence illustrated and/or described, in other sequences, in parallel, or omitted. Likewise, the order of the above-described methods may be changed.

The subject matter of the present disclosure includes all novel and non-obvious combinations and sub-combinations of the various methods, systems and configurations, and other features, functions, acts, and/or properties disclosed herein, as well as any and all equivalents thereof.

The invention claimed is:

1. A target classification system comprising:
   a display subsystem configured to display an image captured by a camera of a first in-field device, the image including one or more targets;
   a user input device configured to receive user input corresponding to locations in the image displayed on the display subsystem;
   a processor; and
   a memory storing instructions executable by the processor to,
      receive a user input from the user input device indicating a location of the one or more targets in a screen space coordinate system of the display subsystem,
      determine location information for the one or more targets in a world space coordinate system of the first in-field device by:
         receiving, from a pose sensor of the first in-field device, a position of the camera and a bearing from the camera to the one or more targets,
         using the position of the camera, the bearing, and the location of the one or more targets in the screen space to trace a ray between the camera and the one or more targets in the world space, wherein the ray comprises a first line of sight from the first in-field device to the one or more targets in the world space,
         receiving at least a second line of sight from at least a second in-field device,
         determining one or more intersection points where the ray intersects with at least the second line of sight,
         generating an input vector comprising the one or more intersection points, and
         inputting the input vector into a trained target location model to thereby cause the trained target location model to output coordinates of the one or more targets in the world space,
      determine target classification information for the one or more targets by:
         tagging the one or more targets with a first target classification when the user input indicates a first input type, and
         tagging the one or more targets with a second target classification when the user input indicates a second input type, and
      outputting targeting data comprising the coordinates of the one or more targets in the world space and the target classification information.

2. The target classification system of claim 1, wherein the coordinates of the one or more targets in the world space are coordinates comprising an origin of the ray and an orientation of the ray.

3. The target classification system of claim 1, wherein the instructions are further executable to:
   receive a distance between the camera and the one or more targets in the world space; and
   use the distance to determine a three-dimensional location of the one or more targets along the ray, wherein the coordinates of the one or more targets in the world space comprise the three-dimensional location.

4. The target classification system of claim 3, wherein the distance is received from a depth camera or a rangefinder of the first in-field device.

5. The target classification system of claim 1, wherein the ray is aligned to an optical axis of the camera.

6. The target classification system of claim 1, wherein the ray is offset from an optical axis of the camera.

7. The target classification system of claim 1, wherein the first in-field device comprises a weapon, an optical instrument, or a vehicle.

8. The target classification system of claim 1, wherein the pose sensor comprises one or more of an inertial measurement unit (IMU), an accelerometer, a gyroscope, a compass, a global positioning system (GPS) sensor, or an altimeter.

9. The target classification system of claim 1, wherein the user input comprises a selection of at least a portion of the image within a graphical user interface (GUI).

10. The target classification system of claim 9, wherein the first input type and the second input type are defined by a user selection of a respective target classification element within the GUI.

11. The target classification system of claim 1, wherein the location of the one or more targets in the screen space comprises coordinates of at least one pixel in the image.

12. At a computing device, a method for classifying a target, the method comprising:
   displaying, via a display subsystem, an image captured by a camera of a first in-field device, the image including one or more targets;
   receiving a user input from a user input device indicating a location of the one or more targets in a screen space coordinate system of the display subsystem;
   determining location information for the one or more targets in a world space coordinate system of the first in-field device by,
      receiving, from a pose sensor of the first in-field device, a position of the camera and a bearing from the camera to the one or more targets,
      using the position of the camera, the bearing, and the location of the one or more targets in the screen space to trace a ray between the camera and the one or more targets in the world space, wherein the ray comprises a first line of sight from the first in-field device to the one or more targets in the world space,
      receiving at least a second line of sight from at least a second in-field device,
      determining one or more intersection points where the ray intersects with at least the second line of sight,
      generating an input vector comprising the one or more intersection points, and
      inputting the input vector into a trained target location model to thereby cause the trained target location model to output coordinates of the one or more targets in the world space;
   determining target classification information for the one or more targets by:
      tagging the one or more targets with a first target classification when the user input indicates a first input type, and
      tagging the one or more targets with a second target classification when the user input indicates a second input type; and
   outputting targeting data comprising the coordinates of the one or more targets in the world space and the target classification information.

13. The method of claim 12, wherein outputting the coordinates of the one or more targets in the world space comprises generating two-dimensional coordinates comprising an origin of the ray and an orientation of the ray.

14. The method of claim 12, further comprising:
receiving a distance between the camera and the one or more targets in the world space; and
using the distance to determine a three-dimensional location of the one or more targets along the ray, wherein the coordinates of the one or more targets in the world space comprise the three-dimensional location.

15. The method of claim 12, wherein receiving the user input comprises receiving a user selection of at least a portion of the image within a graphical user interface (GUI).

16. The method of claim 15, wherein the first input type and the second input type are defined by a user selection of a respective target classification element within the GUI.

17. The method of claim 12, wherein the location of the one or more targets in the screen space comprises coordinates of at least one pixel in the image.

18. A target classification system comprising:
a display subsystem configured to display a graphical user interface (GUI) comprising,
an image captured by a camera of a first in-field device, the image including one or more targets,
a first target classification element configured to receive a user selection indicating a first target classification, and
a second target classification element configured to receive a user selection indicating a second target classification;
a user input device;
a processor; and
a memory storing instructions executable by the processor to,
receive, from the user input device, a user selection of at least a portion of the image, wherein the user selection comprises at least one pixel in the image, and coordinates of the at least one pixel in the image correspond to a location of the one or more targets in a screen space coordinate system of the display subsystem,
determine location information for the one or more targets in a world space coordinate system of the first in-field device by,
receiving, from a pose sensor of the first in-field device, a position of the camera and a bearing from the camera to the one or more targets,
using the position of the camera, the bearing, and the location of the one or more targets in the screen space to trace a ray between the camera and the one or more targets in the world space, wherein the ray comprises a first line of sight from the first in-field device to the one or more targets in the world space,
receiving at least a second line of sight from at least a second in-field device,
determining one or more intersection points where the ray intersects with at least the second line of sight,
generating an input vector comprising the one or more intersection points,
inputting the input vector into a trained target location model to thereby cause the trained target location model to output coordinates of the one or more targets in the world space,
determine target classification information for the one or more targets by:
tagging the one or more targets with the first target classification when the first target classification element is selected, and
tagging the one or more targets with the second target classification when the second target classification element is selected, and
outputting targeting data comprising the coordinates of the one or more targets in the world space and the target classification information.

19. The target classification system of claim 18, wherein the coordinates of the one or more targets in the world space are two-dimensional coordinates comprising an origin of the ray and an orientation of the ray.

20. The target classification system of claim 18, wherein the instructions are further executable to:
receive a distance between the camera and the one or more targets in the world space; and
use the distance to determine a three-dimensional location of the one or more targets along the ray, wherein the coordinates of the one or more targets in the world space comprise the three-dimensional location.

* * * * *